US007610190B2

(12) United States Patent
Polanyi et al.

(10) Patent No.: US 7,610,190 B2
(45) Date of Patent: Oct. 27, 2009

(54) SYSTEMS AND METHODS FOR HYBRID TEXT SUMMARIZATION

(75) Inventors: Livia Polanyi, Palo Alto, CA (US); Martin H. Van Den Berg, Palo Alto, CA (US); Giovanni Lorenzo Thione, San Francisco, CA (US); Richard S. Crouch, Cupertino, CA (US); Christopher D. Culy, Mountain View, CA (US); David D. Ahn, Palo Alto, CA (US)

(73) Assignee: FUJI XEROX Co., Ltd., Tokyo (JP)

( * ) Notice: Subject to any disclaimer, the term of this patent is extended or adjusted under 35 U.S.C. 154(b) by 1108 days.

(21) Appl. No.: 10/684,508

(22) Filed: Oct. 15, 2003

(65) Prior Publication Data

US 2005/0086592 A1 Apr. 21, 2005

(51) Int. Cl.
G06F 17/27 (2006.01)
(52) U.S. Cl. .................. 704/9; 707/1; 707/3; 707/6; 715/12; 715/201
(58) Field of Classification Search .............. 707/3, 707/1, 6; 704/9; 715/12, 201
See application file for complete search history.

(56) References Cited

U.S. PATENT DOCUMENTS

| | | | | |
|---|---|---|---|---|
| 4,658,436 | A * | 4/1987 | Hill | 380/31 |
| 6,067,515 | A * | 5/2000 | Cong et al. | 704/243 |
| 6,104,992 | A * | 8/2000 | Gao et al. | 704/220 |
| 6,188,976 | B1 * | 2/2001 | Ramaswamy et al. | 704/9 |
| 6,188,980 | B1 * | 2/2001 | Thyssen | 704/230 |
| 6,205,456 | B1 * | 3/2001 | Nakao | 715/201 |
| 6,349,316 | B2 * | 2/2002 | Fein et al. | 715/267 |
| 6,363,381 | B1 * | 3/2002 | Lee et al. | 707/6 |
| 6,366,578 | B1 * | 4/2002 | Johnson | 370/353 |
| 6,571,238 | B1 * | 5/2003 | Pollack et al. | 707/5 |
| 6,618,702 | B1 * | 9/2003 | Kohler et al. | 704/250 |
| 6,721,707 | B1 * | 4/2004 | Chu et al. | 704/500 |
| 6,738,759 | B1 * | 5/2004 | Wheeler et al. | 707/3 |

(Continued)

OTHER PUBLICATIONS

Jing, H., McKeown, K., Cut and Paste Based Text Summarization, in Proceedings of the North American Association for Computational Linguistics, 2000.

(Continued)

*Primary Examiner*—Richemond Dorvil
*Assistant Examiner*—Michael C Colucci
(74) *Attorney, Agent, or Firm*—Sughrue Mion, PLLC; Pavel I. Pogodin

(57) ABSTRACT

Techniques are provided for segmenting text into categorized discourse constituents and attaching discourse constituents into a structural representation of discourse. Techniques for determining hybrid structural and non-structural summaries of a text are also provided. A text is segmented based on a theory of discourse analysis into at least a main discourse constituent containing spatio-temporal information about a single event in a possible world view. The discourse constituents are then inserted into a structural representation of discourse. Non-structural techniques are used to determine relevance scores and important discourse constituents are determined. Relevance scores are percolated through the structural representation of discourse to determine supporting preceding discourse constituents that preserve grammaticality. A hybrid text summary is then determined based on the structural representation of the discourse and relevance scores.

21 Claims, 20 Drawing Sheets

U.S. PATENT DOCUMENTS

| | | | |
|---|---|---|---|
| 6,901,399 B1* | 5/2005 | Corston et al. | 707/6 |
| 6,968,309 B1* | 11/2005 | Makinen et al. | 704/219 |
| 7,139,752 B2* | 11/2006 | Broder et al. | 707/4 |
| 2002/0040363 A1* | 4/2002 | Wolfman et al. | 707/5 |
| 2002/0046018 A1* | 4/2002 | Marcu et al. | 704/9 |
| 2002/0052730 A1* | 5/2002 | Nakao | 704/10 |
| 2002/0065857 A1* | 5/2002 | Michalewicz et al. | 707/532 |
| 2002/0083104 A1 | 6/2002 | Polanyi et al. | |
| 2002/0194230 A1 | 12/2002 | Polanyi et al. | |
| 2002/0198697 A1* | 12/2002 | Datig | 704/1 |
| 2003/0093275 A1 | 5/2003 | Polanyi et al. | |
| 2003/0093514 A1* | 5/2003 | Valdes et al. | 709/224 |
| 2003/0142730 A1* | 7/2003 | Lin | 375/147 |
| 2004/0024739 A1* | 2/2004 | Copperman et al. | 707/1 |
| 2004/0030741 A1* | 2/2004 | Wolton et al. | 709/202 |
| 2004/0034520 A1* | 2/2004 | Langkilde-Geary et al. | 704/1 |
| 2004/0044519 A1* | 3/2004 | Polanyi et al. | 704/9 |
| 2004/0049391 A1 | 3/2004 | Polanyi et al. | |
| 2004/0054654 A1* | 3/2004 | Nomiyama et al. | 707/1 |
| 2004/0067472 A1 | 4/2004 | Polanyi et al. | |
| 2004/0139057 A1* | 7/2004 | Hirata et al. | 707/3 |
| 2004/0139397 A1* | 7/2004 | Yuan et al. | 715/517 |
| 2004/0153440 A1* | 8/2004 | Halevy et al. | 707/3 |
| 2004/0230415 A1 | 11/2004 | Riezler et al. | |
| 2004/0243645 A1* | 12/2004 | Broder et al. | 707/200 |
| 2006/0222090 A1* | 10/2006 | Simmons et al. | 375/259 |
| 2006/0282737 A1* | 12/2006 | Shi et al. | 714/746 |
| 2007/0239660 A1* | 10/2007 | Tien et al. | 707/2 |

OTHER PUBLICATIONS

Hinrichs, E., Polanyi, L., "Pointing the Way: A unified Treatment of Referential Gesture in Interactive Contexts", in Proceedings of the Parasession of the Chicago Lingusitics Society Annual Meetings (Pragmatics and Grammatical Theory) Chicago, 1986.

Hovy, E., "Automated Discourse Generation Using Discourse Structure Relations", Artificial Intelligence, 63: 341-385, Amsterdam, 1993.

Mann, W., Thompson, S., "Rhetorical Structure Theory", Text 8:3 pp. 243-281, 1988.

McKeown, K., "Text Generation: Using Discourse Strategies and Focus Constraints to Generate Natural Language Text", Cambridge University Press, 1985.

Polanyi, L., Scha, R., "On the Recursive Structure of Discourse" in Ehlick and van Riemsdijk, Connectedness in Sentence Discourse and Text, pp. 141-178, Tilburg University, Netherlands, 1984.

Polanyi, L., Scha, R., "A Syntactic Approach to Discourse Semantics" in Proceedings of COLING , 413-419, Stanford, CA 1984.

Robinson, J., "A Machine-oriented Logic Based on the Resolution Principle", Journal of the ACM, 12 : 23-41, 1965.

InXight Summarizer: Managing the Information Deluge: Inxight WhIte Paper Series, InxIght Software Inc., 2002., downloaded from http://www.inxight.com/pdfs/summarIzer_managing_deluge.pdf on Jul. 8, 2004.

L. Polanyi et al., "System and Method for Teaching Writing Using Microanalysis of Text", U.S. Appl. No. 09/609,325.

L. Polanyi et al., "System and Method for Writing Analysis Using the Linguistic Discourse Model", U.S. Appl. No. 09/630,371.

L. Polanyi et al., "System and Method for Generating Text Summaries", U.S. Appl. No. 09/689,779.

Marcu, Daniel, The Theory and Practice of Dicourse Parsing and Summarization, pp. 162-168, the MIT Press, 2000.

Hinrichs, E., Polyanyi, L., "Pointing the Way: A unified Treatment of Referential Gesture in Interactive Contexts", in Proceedings of the Parasession of the Chicago Lingusitics Society Annual Meetings (Pragmatics and Grammatical Theory) Chicago, 1986.

Polanyi. L., Scha, R., "On the Recursive Structure of Discourse" in Ehlick and van Riemsdijk, Connectedness in Sentence Discourse and Text, pp. 141-178, Tilburg University, Netherlands, 1984.

Polanyi, L., Scha, R., "A Syntactic Approach to Discourse Semantics" in Proceedings of Coling , 413-419, Stanford, CA 1984.

InXight Summarizer: Managing the Information Deluge: Inxight White Paper Series, Inxight Software Inc., 2002., downloaded from http://www.inxight.com/pdfs/summartzer_managing_deluge.pdf on Jul. 8, 2004.

L. Polanyi et al., "System and Method for Teaching Writing Using Microanalysis of Text", U.S. Appl. No. 09/609,325, 2005.

L. Polanyi et al., "System and Method for Writing Analysis Using the Linguistic Discourse Model", U.S. Appl. No. 09/630,371, 2005.

L. Polanyi et al., "System and Method for Generating Text Summaries", U.S. Appl. No. 09/689,779, 2007.

* cited by examiner

| ID | TYPE | PATTERN | ACTION |
|---|---|---|---|
| 1 | SIMPLE_EVENTS | SIMPLE_EVENT | BDU=TRUE |
| 2 | DISCLOSURE_OPERATOR | MODIFIER | BDU=TRUE |
| 3 | INTERPOLATIONS | APPOSITIVE OR PARENTHETICAL OR INTERRUPTION OR NON_RESTRICTIVE_CLAUSE OR REFERENCE | BDU=TRUE |
| 4 | SUBORDINATE_CLAUSES | COMPLEMENT_CLAUSE OR SENTENTIAL_SUBJECT OR RELATIVE_CLAUSE | BDU=TRUE |
| 5 | POSTNOMINAL_MODIFIER | (DISCRETE_EVENT AND (POSTNOMINAL_MODIFIER OR RELATIVE_CLAUSE OR PARTCIPIAL_MODIFIER)) | BDU=TRUE |
| 6 | MORPHOLOGICAL_FORM | ((DISCRETE_EVENT AND (INFINITIVES OR GERUNDS)) | BDU=TRUE |
| 7 | OTHER_PREDICATION | (COPULAR_PREDICATION OR SECONDARY PREDICATION OR DISCRETE_EVENT) | BDU=TRUE |
| 8 | SUBORDINATING_CONJUNCTIONS | (SUBORDINATING_CONJUNCTION AND DISCRETE_EVENT) | BDU=TRUE |
| 9 | COORDINATING_CONJUNCTIONS | ((COORDINATING_CONJUNCTION AND LENGTH = 1) OR ((X COORDINATING_CONJUNCTION Y) AND (X ISA BDU AND Y ISA BDU)) | BDU=TRUE |
| 10 | INFORMATION_STRUCTURE | (COPULA AND (CLEFT OR PSEUDO_CLEFT)) | BDU=FALSE |
| 11 | EVENT_MODIFIER | (EVENT_MODIFIER AND NOT(DISCRETE_EVENT)) | BDU=FALSE |
| . | . | . | . |
| . | . | . | . |
| . | . | . | . |
| 14 | INITIAL MODIFIER | (INITIAL_MODIFIER AND SCENE_SETTING) | BDU=TRUE |

Fig. 6

| ID | RULE |
|---|---|
| 1 | <br>Sx: (M-BDU/TYPE) = "BetweenParenthesis";<br>St: AP is BottomOfTree;<br>> → Subordinate(AP, M-BDU) |
| 2 | <br>Sx: (AP/Tense) =<br>"Present";<br>Sx: (M-BDU/Tense) =<br>"Past";<br>> → Subordinate(AP, M-BDU) |
| 3 | <br>LS: (AP) isa (KB/Event);<br>LS: (M-BDU) isa (KB/Event);<br>Sx: (AP/Tense) = (M-BDU/Tense);<br>> → Coordinate(AP, M-BDU) |
| 4 | <br>LS: (AP/Lexeme) hasa<br>(M-BDU/Lexeme) : $1 : $2;<br>Sx: AP/*/COMP) is $1;<br>Sx: (M-BDU/*/SUBJ) is $2;<br>> → Subordinate(AP, M-BDU) |
| 5 | <br>Sx: (M-BDU/Type) = "Temporal";<br>St: M-BDU isSubordinatedTo AP;<br>> → CreateNary (Cx, AP, M-BDU) |
| 6 | <br>Sm: Σ(AP) is "Generic";<br>Sm: Σ(M-BDU) is "Specific";<br>>→Subordinate(AP, M-BDU) |
| 7 | <br>Sm: Σ(AP) is "Irrealis";<br>Sm: Σ(M-BDU) is "Realis";<br>Sx: if AP then M-BDU;<br>>→ CreateNary(HYP, AP, M-BDU) |
| 8 | <br>Sm: Σ(AP) is "Irrealis";<br>Sm: Σ(M-BDU) is "Realis";<br>Sx: if AP but/instead M-BDU;<br>>→ CreateNary(HYP, AP, M-BDU) |
| 9 | <br>Sx: AP but M-BDU<br>>→ Coordinate(AP,M-BDU); |
| 10 | <br>Sm: Σ(AP) is "Generic" : $1;<br>Sm: Σ(M-BDU) is "Generic" : $2;<br>LS: $1 ant $2;<br>>→ Subordinate(AP, M-BDU) |
| 11 | <br>Sm: PointOfView(Σ(AP)) != PointOfView(Σ(M-BDU));<br>>→Subordinate(AP,M-BDU); |
| 12 | <br>Sm: Σ(AP) is "Narrative";<br>Sm: Σ(M-BDU) is "Narrative";<br>Px: Ifnot AnyRule(LS) applies;<br>>→Coordinate(AP,M-BDU); |
| 99 | <br>St: AP is BottomOfTree;<br>Px: Ifnot AnyRule applies;<br>>→ Subordinate(AP, M-BDU) |

Fig. 7

SYSTEMS AND METHODS FOR HYBRID TEXT SUMMARIZATION

INCORPORATION BY REFERENCE

This Application incorporates by reference: U.S. patent application Ser. No. 09/609,325, entitled "System and Method for Teaching Writing Using Microanalysis of Text" by L. POLANYI et al., since issued as U.S. patent No. 7,013,259 on Mar. 14, 2006; U.S. patent application Ser. No. 09/689,779, entitled "A System and Method for Generating Text Summaries" by L. POLANYI et al., since abandoned; U.S. patent application Ser. No. 09/883,345, entitled "System and Method for Generating Analytic Summaries" by L. POLANYI et al., since issued as U.S. patent No. 7,092,872 on Aug. 15, 2006; U.S. patent application Ser. No. 10/231,732, entitled "A System and Method for Summarization Containing Natural Language Generation with Structural Analysis" by L. POLANYI et al., since issued as U.S. patent No. 7,305,336 on Dec. 4, 2007; and U.S. patent application Ser. No. 10/435,036, entitled "Systems and Methods for Grammatical Text Condensation" by S. RIEZLER et al. each, in their entirety.

BACKGROUND OF THE INVENTION

1. Field of Invention

This invention relates to determining summaries of text information.

2. Description of Related Art

Corporations, government regulators, intelligence analysts and other researchers and knowledge workers are faced with reviewing and understanding an ever-increasing volume of information. Some researchers have attempted to reduce the volume of information by creating summaries based on the most relevant information. Relevance measures are frequently based on non-structural features such as keywords and/or term-frequency and inverse document frequency statistics for sets of documents in an information repository. However, these conventional, non-structural text summaries are frequently disjointed and difficult to read. Moreover, elements selected for these non-structural text summaries are based on statistical measures of importance. Therefore, pronouns in sequentially selected text summary elements may refer to elided preceding references reducing the usefulness of these conventional summaries.

Other researchers have attempted to improve the quality of text summaries by selectively removing less important information from a structure based summary. In these conventional structure based text summary systems, a structural representation of the text is determined. Less important information is pruned from the structural representation by selecting a desired level of subordination to be included in the text summary. These conventional structural text summaries preserve grammaticality by including referent information. However, the resultant text summary frequently includes more information than necessary to resolve the referent.

SUMMARY OF THE INVENTION

Thus systems and methods that allow the combination of structural and non-structural information in determining a hybrid text summary would be useful. Various exemplary embodiments according to the systems and methods of this invention allow the combination of structural and non-structural information in determining a grammatical hybrid text summary. A text is segmented based on the segmentation rules of a theory of discourse analysis to determine discourse constituents. The determined discourse constituents are conjoined into a structural representation of discourse based on the attachment rules of the theory of discourse analysis. Relevance scores are determined based on statistics, keywords, knowledge bases or any known or later developed non-structural method of determining relevance. The relevance scores are percolated to structurally related discourse constituent nodes in the structural representation of discourse. A selectable and/or adjustable importance score is used to select a sub-tree of discourse constituents from the structural representation of discourse. Adjustments to the percolation methods and/or relevance scores are used to adjust the compression of the sub-tree of discourse constituents to form a hybrid text summary. Systems and methods of segmenting text into basic discourse constituents and classifying the discourse constituents based on a theory of discourse analysis are provided. Systems and methods of conjoining each type of determined discourse constituent into a structural representation of discourse are also provided.

BRIEF DESCRIPTION OF THE DRAWINGS

FIG. 6 is an exemplary data structure for storing segmentation rules according to an embodiment of this invention FIG. 7 is an exemplary data structure for storing attachment rule information according to an embodiment of this invention;

DETAILED DESCRIPTION OF EXEMPLARY EMBODIMENTS

Figure 1:
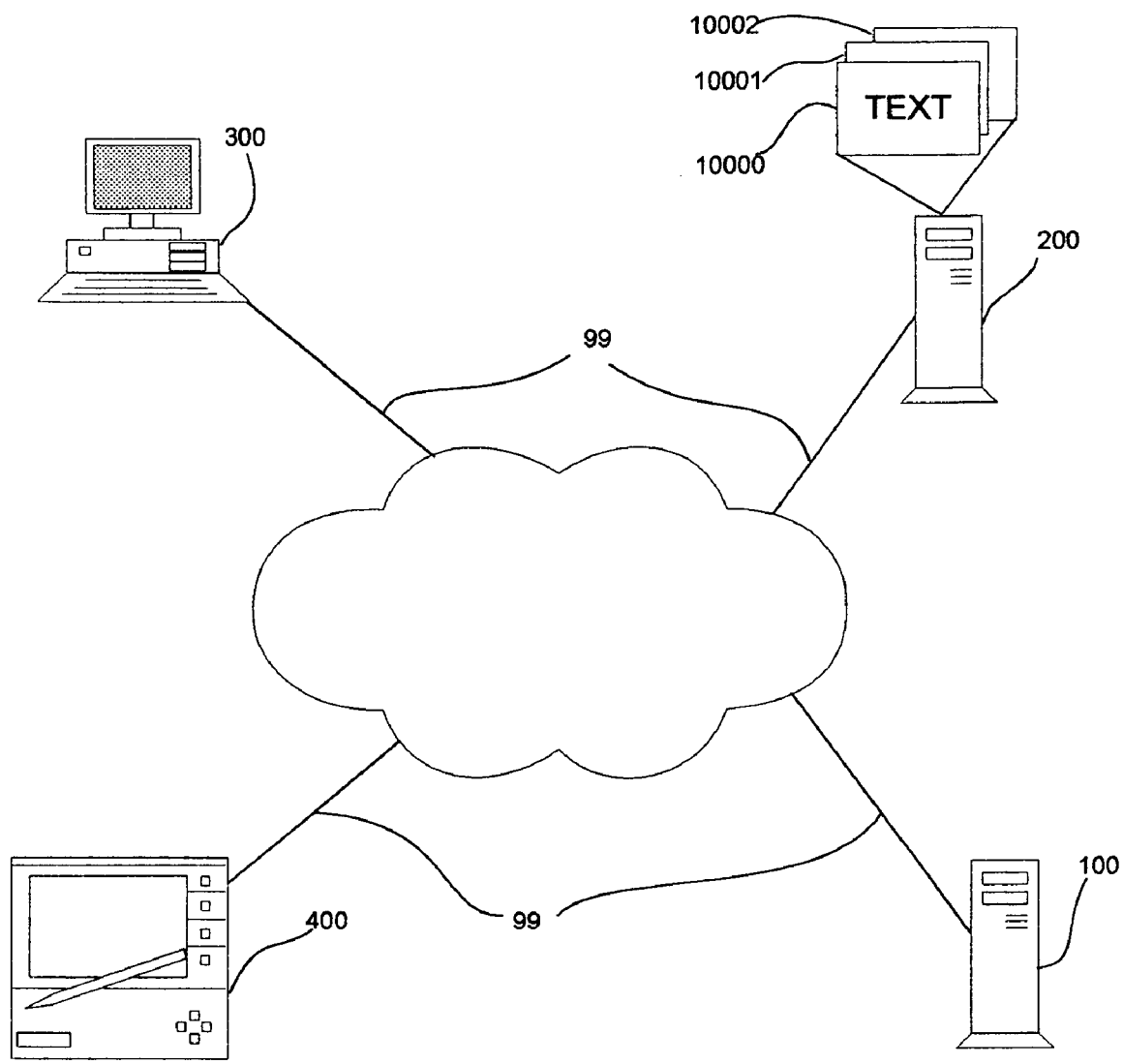
FIG. 1 is an overview of an exemplary hybrid summarization system according to this invention.

FIG. 1 is an overview of an exemplary hybrid summarization system 100 according to this invention. The hybrid summarization system 100 is connected via communications link 99 to a web-enabled personal computer 300, a web-enabled tablet computer 400 and an information repository 200 containing documents 10000-10002.

In one of the various exemplary embodiments according to this invention, a user of the web-enabled personal computer 300 initiates a request for a hybrid text summary of document 10000 contained in the information repository 200. The request is forwarded over communications link 99 to the hybrid summarization system 100. The hybrid summarization system 100 mediates the request for the hybrid text summary. The hybrid summarization system 100 then retrieves the document 10000 from the information repository 200. The text of document 10000 is then segmented into discourse constituents based on the determined segmentation rules for the theory of discourse analysis.

In various exemplary embodiments according to this invention, the segmentation rules are used to segment the text into basic discourse constituents units (BDUs). The basic discourse constituent units are determined based on segmentation rules developed for the Unified Linguistic Discourse Model (ULDM), the Rhetorical Structure Theory (RST), the Discourse Structure Theory, the Structured Discourse Representation Theory (SDRT) or any other known or later developed theory of discourse analysis. For example, each basic discourse constituent in the Linguistic Discourse Model is composed of a linguistic gesture interpreted relative to context that communicates: 1) information about not more than one state of affairs in a possible world; and 2) function information that encodes information about how previously occurring or possibly subsequent linguistic gestures relate structurally, semantically, interactively or rhetorically to other units in the discourse or context in which the discourse takes place. The sentential syntactic reflex of a linguistically realized basic discourse constituent unit is a segment accessible for continuation from outside the sentence in which it is found. Reference to an event is necessary but not sufficient for a word to be a head of most discourse constituents. Thus, auxiliary and modal verbs will not form separate discourse constituent from their main verbs, since they do not refer to separate events. Other modal constructions that involve infinities such as "have to", "ought to", and the like also constitute a single segment with their complements by the same reasoning.

Thus, to determine discourse constituent units, a candidate discourse constituent segment must reference an event and provide the context sufficient to "continue" the event later in the discourse. Equi verbs such as "try" and "persuade" and raising verbs such as "seem" and "believe" form separate arguments from their verbal complements since both events can be continued. In contrast, even though event nominals, including gerunds refer to events possibly distinct from the verbs they are arguments or adjuncts of, those events are not easily continued.

The Unified Linguistic Discourse Model links the determined basic discourse constituents into a structural representation of discourse based on attachment rules. The attachment rules are used to determine how basic discourse constituents are linked into the open right tree structural representation of discourse.

For example, the Unified Linguistic Discourse Model provides syntactic, semantic, lexical-semantic, structural and default attachment rules that can be used singly or in combination to link basic discourse constituents into a structural representation of discourse based on an open right tree. Statistical, keyword and/or any other known or later developed methods of determining important discourse constituents are used to define a sub-tree of linked discourse constituents. Additional supporting discourse constituents are included based on the attachment rules associated with the theory of discourse analysis. It will be apparent that in various other exemplary embodiments according to this invention, attachment or link support information may be combined with the statistical, keyword and/or other relevance information into a single relevance score associated with each discourse constituent. After the hybrid summarization system determines the hybrid text summary, the hybrid text summary is forwarded to the web-enabled personal computer 300.

In another exemplary embodiment according to this invention, the user of web-enabled tablet computer 400 requests a hybrid text summary of the document 10001 in the information repository 200. The request is forwarded over communications link 99 to the hybrid summarization system 100. The hybrid summarization system 100 retrieves the document 10001 from the information repository 200 over communications link 99. A structural representation of discourse is determined for the requested document 10001 based on a theory of discourse analysis that specifies the links between determined discourse constituents. Statistical analysis, keywords, knowledge base searches or any known or later developed method of determining important information may be used to determine important discourse constituents in the text. For example, statistical and/or keyword based techniques are applied to determine discourse constituents having relevance scores which exceed a threshold importance score. The determined important discourse constituents and supporting preceding discourse constituent within the structural representation of discourse define a sub-tree of discourse constituents.

In various exemplary embodiments according to this invention, the relevance scores of the discourse constituent leaf nodes are percolated through the structural representation of discourse to adjust the relevance scores of other discourse constituents. Percolation of the relevance scores may be adjusted based on the theory of discourse analysis to include varying numbers of supporting accessible discourse constituents. Different percolation methods may be specified based on differing genres of text, different languages or any attribute of the text or document likely to affect the structural representation of discourse.

Although other theories of discourse analysis may differ in the details of how the information is encoded into the structure, the identification of preceding supporting discourse constituents and percolation of the relevance scores based on structure may be used with any text summarizer that preserves grammaticality. For example, if the structural representation of discourse is based on the Unified Linguistic Discourse Model, (ULDM) a reduced sub-tree of relevant discourse constituents from the structural representation of discourse having the important discourse constituents as leaf nodes is determined as the hybrid text summary.

Figure 2:
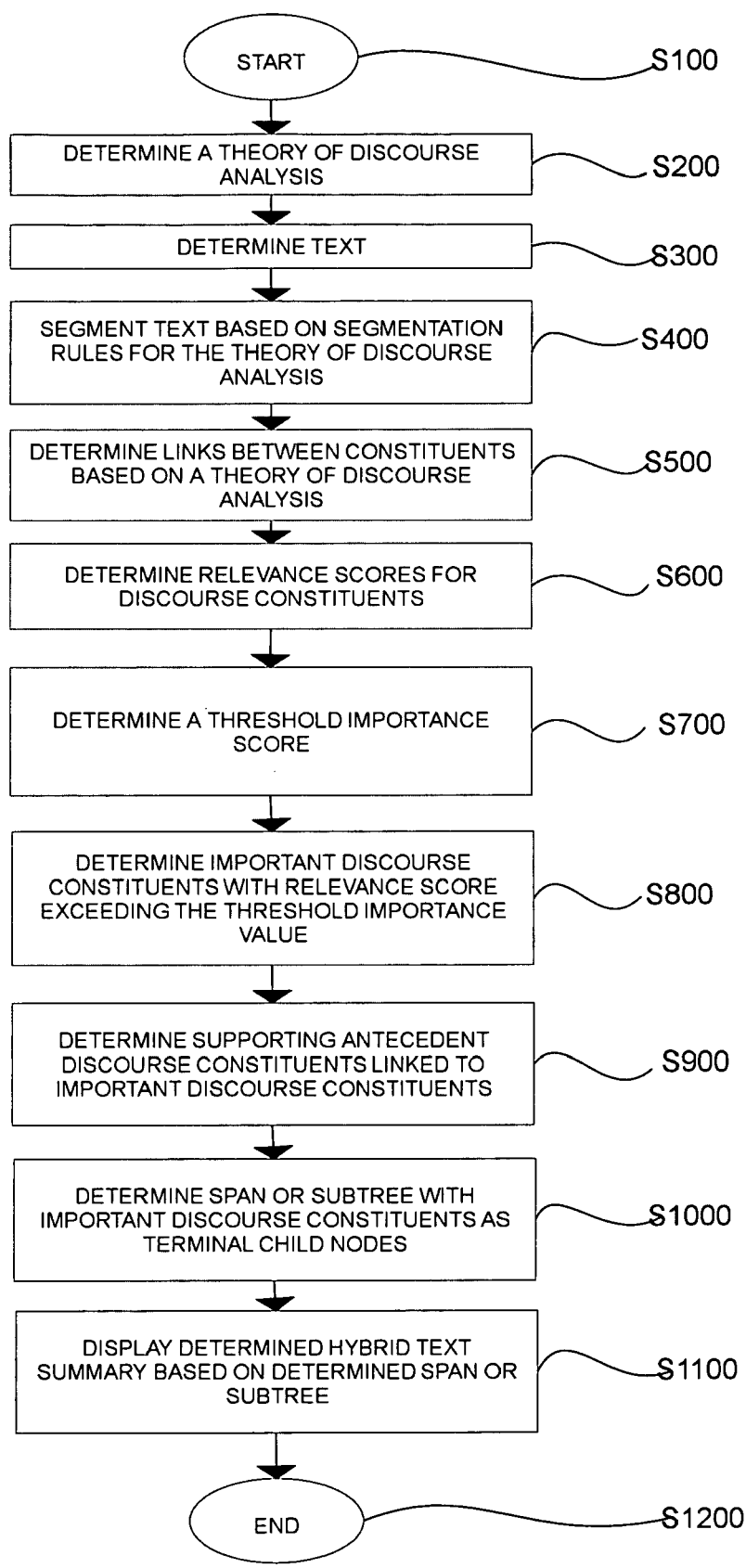
FIG. 2 is a first method of determining a hybrid text summary according to an exemplary embodiment of this invention.

FIG. 2 is a first method of determining a hybrid text summary according to an exemplary embodiment of this invention. The process begins at step S100 and continues immediately to step S200 where a theory of discourse analysis is determined. Control then continues to step S300.

In step S300, the text to be summarized is determined. The text may be determined by selecting a previously generated text from a drop down dialog box, entered using an editor or word processor, retrieved from an information repository such as a web server or digital library or determined using any known or later developed text selection method. After the text has been determined, control continues to step S400 where the text is then segmented into discourse constituents based on the segmentation rules of the theory of discourse analysis.

The text may be segmented based on any theory of discourse analysis that determines a graph of discourse constituents. For example, the Linguistic Discourse Model and the Unified Linguistic Discourse Model each provide segmentation rules for determining discourse constituents in a text. The segmentation rules of the Unified Linguistic Discourse Model segment the text such that each identified discourse constituent can be conjoined into an open right tree based on coordination, subordination and N-ary or binary nodes. However, in various other exemplary embodiments according to this invention, other theories of discourse analysis capable of linking and ordering discourse constituents may also be used in the practice of this invention. After the text has been segmented, control continues to step S500.

In step S500, the links between the discourse constituents are determined. In the Unified Linguistic Discourse Model, the attachment rules for linking discourse constituents into a structural representation of discourse may be categorized as 1) syntactic; 2) semantic; 3) lexical-semantic; 4) structural and 5) default rules. The syntactic rules are used to specify a relation between discourse constituents based on the presence in the discourse constituents of syntactic attributes carried by sentential constituents such as tense, aspect, subject, object or sentential-syntax identifiable features such as parentheticals, comma delimited portions and the like.

The semantic rules of the Unified Linguistic Discourse Model specify relationships established by the occurrence of particular attributes, truth-values or relations in the semantic representations assigned to natural language discourse constituents. For example, with no additional context, the presence of a general element in a first discourse constituent followed by a specific element in a second discourse constituent is used to define a pattern that matches a semantic subordination rule. If the semantic subordination rule is matched, the discourse constituent containing the specific element is subordinated to the discourse constituent containing the general element by inserting a subordination node into the structural representation of discourse that links the two discourse constituents. In various other exemplary embodiments according to this invention, certain quantifiers, determiners such as "the" and "a" or other patterns or structures capable of differentiating general and specific interpretations of the discourse constituents are used to determine semantic subordinations according to this invention.

The lexical-semantic rules of the Unified Linguistic Discourse Model specify the relationship between discourse constituents in which simple or complex lexical items, lexical collections or idiomatic expressions denoting entities or properties in the constituents exhibit a specific type of relationship to one another. For example, "clothes" and "jacket" have a particular type of relationship. Similarly, a hallway is an architectural feature in a specific relationship to a building. That is, a hallway is always found within a building, although a building may not always contain a hallway. Another example is presented by the sentences "Europeans speak different languages. The French speak French." A general to specific relationship exists between "European" in the first sentence and "French" in the second sentence. The general to specific relationship indicates a likely subordination. The phrase "For example, but not limited to" specifies that the items that follow are in some relationship with each other. Phrases of the form "is a type of", "is a part of", "has a", "is equivalent to", "is in contrast to" and the like, also provide information that the discourse constituents are attached to the discourse tree using a lexical-semantic rule. The occurrence of any or all of these phrases may be used to enable and/or disable additional sets of lexical-semantic rules.

Structural rules of the Unified Linguistic Discourse Model specify the type of relation that holds between a structural representation of discourse and a discourse constituent being conjoined to that representation. The structural rules constrain the structural attachment point of the discourse constituent to the structural representation as well as the nature of that attachment. The discourse constituent being conjoined to the structural representation will be made up of one or more units derived from a single sentence and conjoined on the basis of the unit corresponding to the main clause of the discourse unit. Thus, it will be apparent that structural rules are useful in reducing the number of candidate attachment points that needs to be considered when adding discourse constituents to the structural representation of discourse.

It will be apparent that in various other exemplary embodiments according to this invention, attachment rules are fired when variables such as the attachment point variable (AP), the main basic discourse unit variable (M-BDU), the current discourse constituent or any other defined variables match the patterns associated with the attachment rules. The attachment rules may be optionally organized into sets of mutually exclusive rules, sets of rules that are enabled only after a specific rule or set of rules has fired or any other category. In still other embodiments according to this invention, multiple rules may be applied, with each rule associated with different weights. After the links between discourse constituents have been determined, control continues to step S600.

In step S600, relevance scores for the discourse constituents are determined. The relevance scores for discourse constituents are determined based on statistics, keyword searches, knowledge bases or any known or later developed relevance measure. After determining the relevance scores for the discourse constituents, control continues to step S700.

A threshold importance score is determined in step S700. The threshold importance score may be retrieved from a user profile and/or entered dynamically. The threshold importance score specifies the importance value necessary for a discourse constituent to be considered important. After the threshold importance value is determined, control continues to step S800.

In step S800, important discourse constituents with relevance scores exceeding the threshold importance score are determined. It will be apparent that the relevance scores and threshold importance scores may also be specified with a negative score, a reciprocal score or any other value that can be compared using any known or later developed monotonic function. Control then continues to step S900.

Supporting preceding discourse constituents linked to the important discourse constituents are determined in step S900.

Supporting preceding discourse constituents are discourse constituents in which antecedent referents to anaphora can be found. The nodes between the important discourse constituent nodes and the root node are determined and control continues to step S1000.

In step S1000, a hybrid text summary is determined based on a span or sub-tree that has important discourse constituents as leaf or terminal nodes. Child nodes of the supporting preceding nodes are selectively included in a hybrid text summary based on the attachment rules for the selected theory of discourse analysis. After the hybrid text summary is determined, control continues to step S1100.

The hybrid text summary is displayed in step S1100. It will be apparent that in various exemplary embodiments according to this invention step S700-S1000 are repeated to dynamically adjust the hybrid text summary based on different selected threshold importance values.

Figure 3:
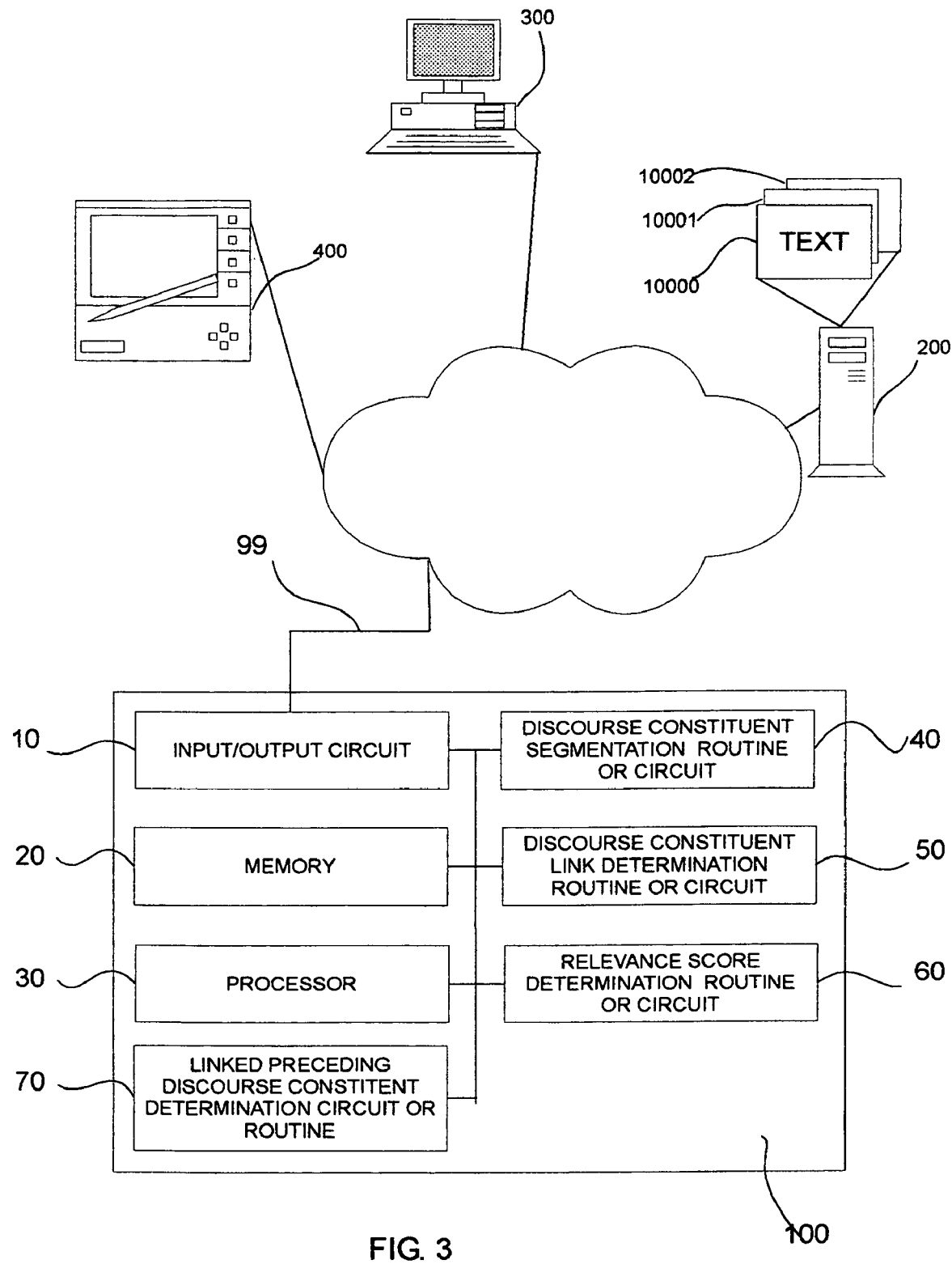
FIG. 3 is a first hybrid summarization system according to an exemplary embodiment of this invention.

FIG. 3 is a first hybrid summarization system according to an exemplary embodiment of this invention. The hybrid text summarization system 100 is comprised of a memory 20; a processor 30; a discourse constituent segmentation routine or circuit 40; a discourse constituent link determination routine or circuit 50; a relevance score determination routine or circuit 60; and a linked preceding discourse constituent determination routine or circuit 70, each connected to input/output circuit via the communications link 99, and to a web-enabled personal computer 300, a web-enabled tablet computer 400 and an information repository 200 containing documents 10000-10002.

In one of the various exemplary embodiments according to this invention, a user of the web-enabled personal computer 300 initiates a request for a hybrid summary of document 10000 contained in information repository 200. The request is forwarded over the communications link 99 to the input/output circuit 10 of the hybrid summarization system 100. The processor 30 activates the input/output circuit 10 to retrieve the requested document 10000 from the information repository 200 over the communication link 99 and store the document 10000 in memory 20.

The processor 30 activates the discourse constituent segmentation routine or circuit 40 to segment the text into discourse constituents. The segmentation may be performed using the Unified Linguistic Discourse Model, Rhetorical Structure Theory or any known or later developed theory of discourse analysis.

After the text has been segmented into discourse constituents, the processor 30 determines the links between the discourse constituents based on a determined theory of discourse analysis by activating the discourse constituent link determination routine or circuit 50. For example, discourse constituents segmented using the segmentation rules of the Unified Linguistic Discourse Model are inserted into an open right tree structural representation of discourse based on the attachment rules. As discussed above, the Unified Linguistic Discourse Model specifies syntactic, semantic, lexical-semantic, structural and default types of attachment rules. Compound attachment rules comprising one or more different types of attachment rules and/or constraints are also provided.

In various other exemplary embodiments according to this invention, variables of different scope may be used to specify conditions and/or sequences of rules to fire. For example, rules may be combined into exclusions sets so that the firing of a first rule in a first set may temporarily or permanently inhibit the firing of a second rule in a second or excluded set. Rules may also be combined into enabling sets so that the firing of the first rule allows a third rule in a third set to be considered for firing. However, it should be apparent that rules can be activated based on any known or later developed sequence and/or combination without departing from the scope of this invention.

The processor 30 then determines the important or relevant discourse constituents by activating the relevance score determination routine or circuit 60. The important discourse constituents are determined based on statistics, keywords, a knowledge base and/or any other relevance information. The relevance score is compared to a previously determined threshold importance score. Discourse constituents with relevance scores exceeding the threshold importance score are considered important discourse constituents. However, it will be apparent that any ordering of relevance scores may be used without departing from the scope of this invention.

The linked preceding discourse constituent determination routine or circuit 70 is activated to determine supporting discourse constituents between the important discourse constituents and the root discourse constituent. For example, in the Unified Linguistic Discourse Model, discourse constituents are added to an open right tree structural representation of discourse. The important discourse constituents serve as the leaf nodes of a sub-tree of the structural representation of discourse. Each parent discourse constituent of the determined important discourse constituent node and the parents of the parents are determined as supporting preceding discourse constituent nodes. The sub-tree of important and supporting preceding discourse constituent nodes defines a hybrid text summary. In various exemplary embodiments according to this invention, adjustments are made to a relevance score associated with each discourse constituent to determine preceding supporting discourse constituents selected for the sub-tree, hybrid text summary.

Figure 4:
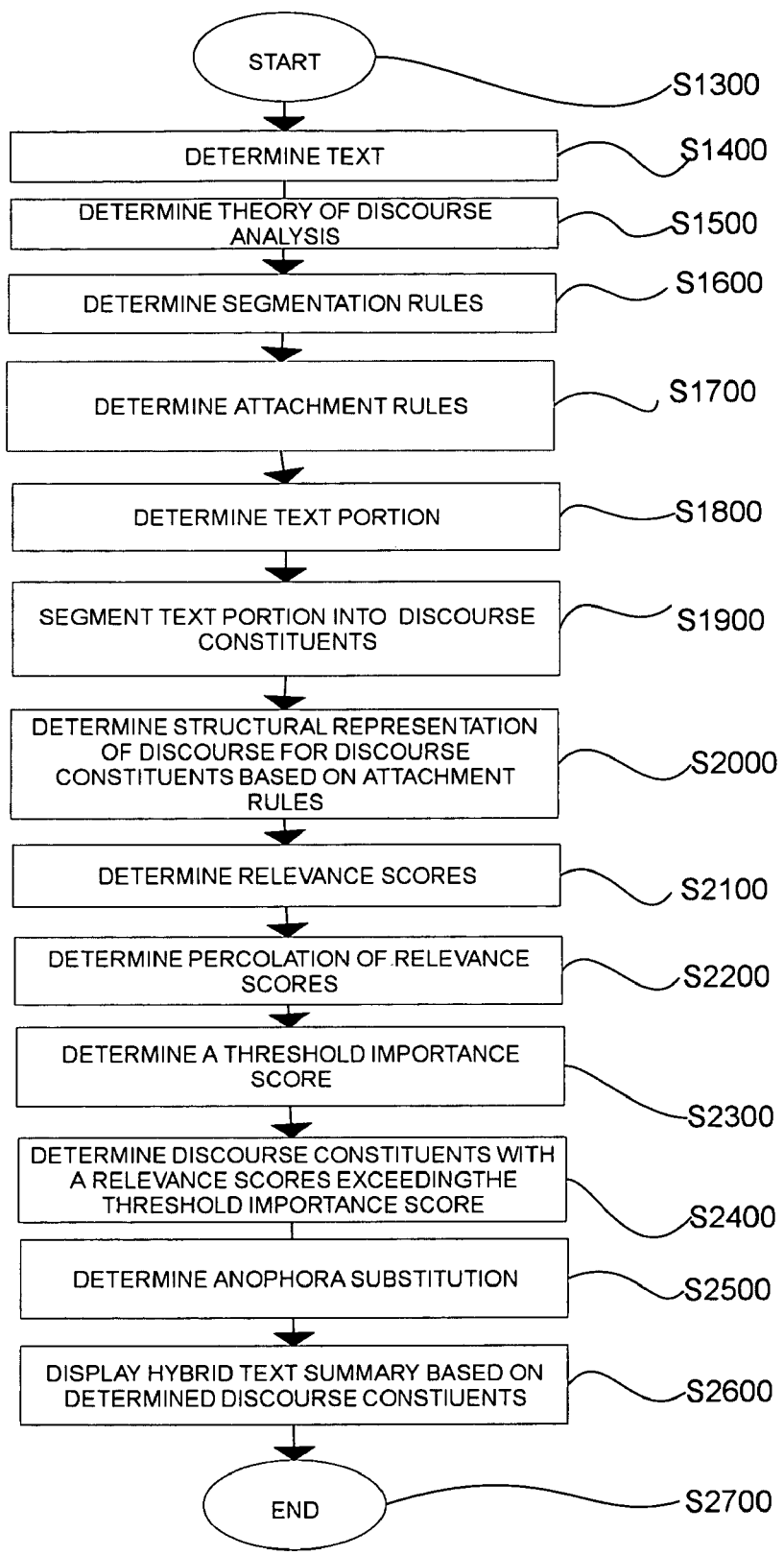
FIG. 4 is a second method of determining a hybrid text summary according to an exemplary embodiment of this invention.

FIG. 4 is a second method of determining a hybrid text summary according to an exemplary embodiment of this invention. The process begins at step S1300 and immediately continues to step S1400.

In step S1400, the text to be summarized is determined. The text may be determined by entering the text manually using an editor or word processor, selecting a text from an information repository such as a web server, digital library and the like, entering the text using voice dictation and/or determined using any known or later developed input and/or selection method. After the text to be summarized is determined, control continues to step S1500.

The theory of discourse analysis is determined in step S1500. The theory of discourse analysis may include but is not limited to the Unified Linguistic Discourse Model, the Linguistic Discourse Model, Rhetorical Structure Theory or any known or later developed theory of discourse analysis capable of linking and ordering discourse constituents into a structural representation of discourse. After the theory of discourse analysis is determined, control continues to step S1600.

The rules for segmenting the text into discourse constituents are then determined in step S1600. For example, various segmentation rules associated with the Unified Linguistic Discourse Model use part-of-speech tags, lexicons and other attributes or features to segment and classify determined discourse constituents into subordination, coordination and binary or n-ary nodes. The segmentation rules are retrieved from a segmentation rule storage structure or entered dynamically based on the theory of discourse analysis. After the segmentation rules have been determined, control continues to step S1700.

In step S1700, attachment rules are determined based on the theory of discourse analysis. The attachment rules of the Unified Linguistic Discourse Model include syntactic, semantic, lexical-sematic, structural and default types of rules. The attachment rules are combined into rule sequences or combinations that determine how a discourse constituent is attached into the structural representation of discourse. The attachment rules may be retrieved from an attachment rule storage structure or entered dynamically. After the attachment rules have been determined, control continues to step S1800 where the portion of the text to be segmented is determined.

In various exemplary embodiments according to this invention, the portion of the text may be determined by highlighting, cursor command, voice control or any known or later developed text selection method. Control then continues to step S1900 where the determined text portion is segmented into discourse constituents based on the determined segmentation rules. Control then continues to step S2000.

A structural representation of discourse is then determined in step S2000. The structural representation of discourse links the determined discourse constituents based on the attachment rules associated with the theory of discourse analysis. Although the syntactic, semantic, lexical-semantic, structural and default rules of the Unified Linguistic Discourse Model are described, it will be apparent that any known or later developed attachment rules useful in determining ordered links between discourse constituents may also be used in the practice of this invention. After the structural representation of discourse is determined, control then continues to step S2100.

In step S2100, the relevance scores for the discourse constituents are determined based on at least one measure of relevance. Relevance scores for discourse constituents may be determined based on statistical scores, keywords and the like. However, any known or later developed relevance measure may also be used in the practice of this invention. After the relevance scores have been determined, control continues to step S2200 where the relevance scores are percolated to accessible discourse constituents in the structural representation of discourse. For example, each discourse constituent terminal child or leaf node is assigned the relevance score of any directly or indirectly subordinated child discourse constituent node with a more relevant relevance score.

In various other exemplary embodiments, the relevance scores are percolated to the preceding discourse constituents that can potentially resolve an anaphor. In still other exemplary embodiments, any unique antecedent referent is substituted for the anaphor in the discourse constituent leaf nodes. After the relevance scores have been percolated through the structural representation of discourse, control continues to step S2300.

In step S2300, a threshold importance score is determined. The threshold importance score is entered interactively by a user, retrieved from a memory, determined based on a user id or the like. The threshold importance score reflects the relevance score necessary to be considered important. Control then continues to step S2400 where the relevance scores for the discourse constituents are compared with the threshold importance score. The comparison of discourse constituent relevance scores is used to selectively adjust the compression of the text. Control then continues to step S2500 where anaphors are optionally substituted. Any unique antecedent referents for the anaphors are determined and optionally substituted in for the anaphor. The discourse constituents with relevance scores exceeding the threshold importance score are determined and optionally displayed in step S2600. Control then continues to step S2700 and the process ends.

Figure 5:
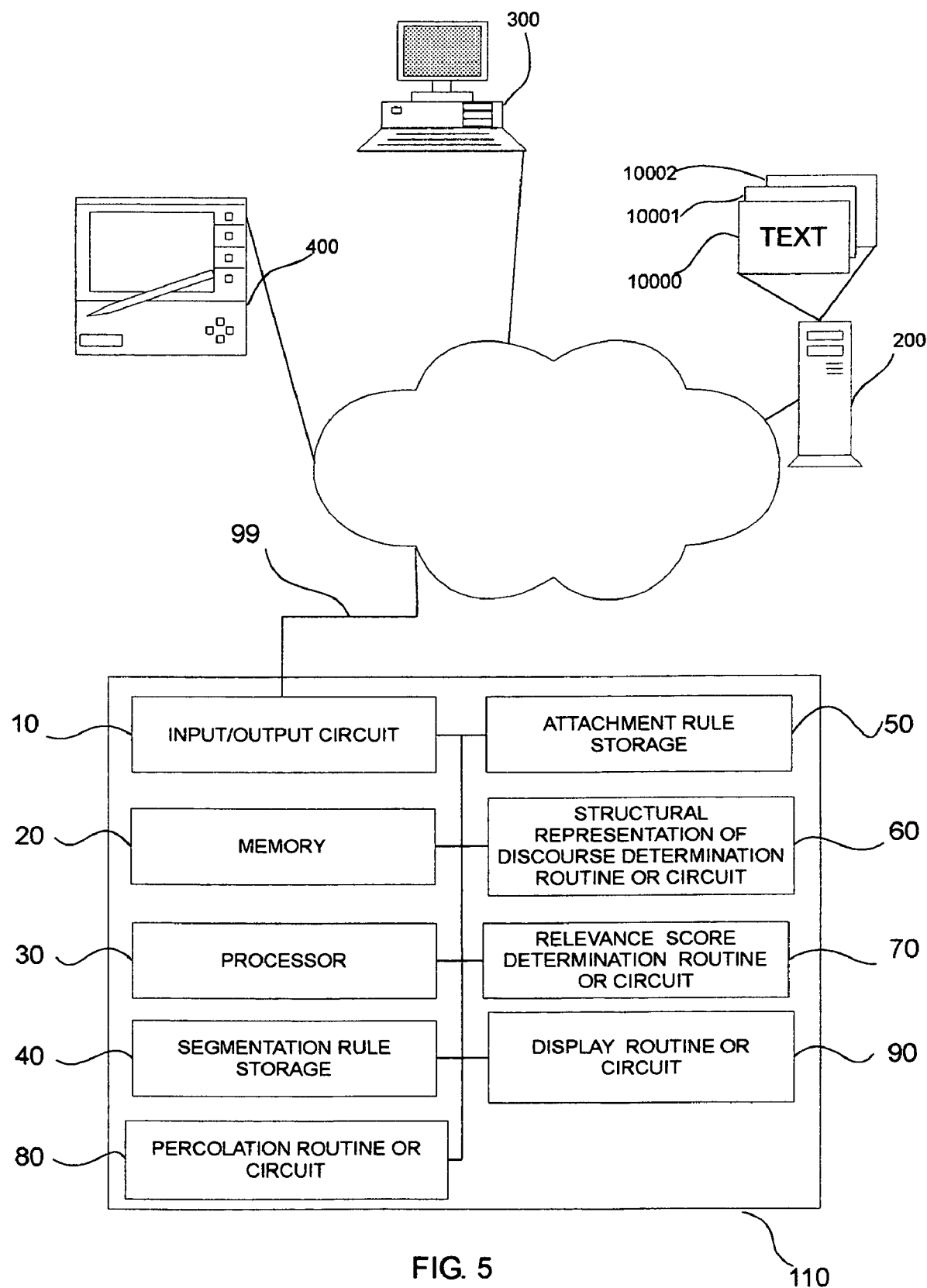
FIG. 5 is a second hybrid summarization system according to an exemplary embodiment of this invention.

FIG. 5 is a second hybrid summarization system according to an exemplary embodiment of this invention. The hybrid summarization system 110 is comprised of a memory 20; a processor 30; a segmentation rule storage 40; an attachment rule storage 50; a structural representation of discourse routine or circuit 60; a relevance score routine or circuit 70; a percolation routine or circuit 80; and a display routine or circuit 90, each connected to the input/output circuit 10; and via communications link 99 to a web-enabled personal computer 300, a web-enabled tablet computer 400, and an information repository 200 containing documents 10000-10002.

In one of the various exemplary embodiments according to this invention, a user of the web-enabled personal computer 300 initiates a request for a hybrid text summary of document 10000 contained in the information repository 200. The request is forwarded over communications link 99 to the input/output circuit 10 of the hybrid summarization system 110. The processor 30 activates the input/output circuit 10 to retrieve the document 10000 from the information repository 200 over the communication link 99 and store it in memory 20.

The processor 30 applies segmentation rules retrieved from the segmentation rule storage 40. The segmentation rules are associated with a previously determined theory of discourse analysis. The segmentation rules specify how to segment the text into discourse constituents. It will be apparent that in various exemplary embodiments according to this invention, the theory of discourse analysis may be determined based on entries by the user, the genre of the text, a portion of text to be summarized or any other method without departing from the scope of this invention.

The structural representation of discourse determination routine or circuit 60 is activated to conjoin the discourse constituents into a structural representation of discourse. For example, the Unified Linguistic Discourse Model (ULDM) specifies attachment rules that define how discourse constituents are linked together into a structural representation of discourse. The Unified Linguistic Discourse Model specifies five types of attachment rules: 1) syntactic; 2) semantic; 3) lexical-semantic; 4) structural and 5) default. The different types of attachment rules may be used alone or may be combined into combinations and/or rule sequences.

The syntactic attachment rules specify relations between discourse constituents based on the presence in the discourse constituents of syntactic attributes carried by sentential constituents such as tense, aspect, subject, object or sentential-syntax identifiable features such as parentheticals, comma delimited portions and the like.

Semantic attachment rules specify relationships established by the occurrence of particular attributes, truth values or relations in the semantic representations assigned to natural language discourse constituents. For example, with no additional context, the presence of a more general element in a first discourse constituent followed by a more specific element in a second discourse constituent defines a pattern that can be used to match a semantic subordination rule. The semantic subordination rule subordinates the specific discourse constituent to the more general discourse constituent. Certain quantifiers, determiners such as "the" and "a" or other determined patterns and/or structures associated with differentiating general and specific interpretations of the discourse constituents may also be used to trigger subordinations of specific discourse constituents to general discourse constituents.

The lexical-semantic rules of the Unified Linguistic Discourse Model specify the relationship between discourse constituents in which simple or complex lexical items, lexical collections or idiomatic expressions denoting entities or properties in the constituents exhibit a specific type of relationship to one another. For example, "clothes" and "jacket"

have a particular type of relationship. Similarly, a hallway is an architectural feature in a specific relationship to a building. That is, a hallway is always found within a building, although a building may not always have a hallway. Another example is presented by the sentences "Europeans speak different languages. The French speak French." A general to specific relationship exists between "European" in the first sentence and "French" in the second sentence. The general to specific relationship indicates a likely subordination relationship. The phrase "For example, but not limited to" specifies that the items that follow are in some relationship with each other. Phrases of the form "is a type of", "is a part of", "has a", "is equivalent to", "is in contrast to" and the like provide information that the discourse constituents are attached to the discourse tree using a lexical-semantic rule. The occurrence of any or all of these phrases may be used to enable and/or disable additional sets of lexical-semantic rules.

Structural attachment rules specify the type of relation that holds between one or both of the discourse constituents being conjoined and other discourse constituents that already form a part of the discourse structure. Structural attachment rules are used to constrain attachment for one or more of the discourse constituents to be conjoined. For example, for two discourse constituents to be conjoined, a rule specifies which discourse attachments should be attached directly to the tree and where the attachment should take place. Thus, structural rules can be used to reduce the number of candidate attachment points that must be considered. Default attachment rules specify the actions to be taken when no other rules apply. Default rules may include combinations of any other type of attachment rule.

It will be apparent that in various other exemplary embodiments according to this invention, rules fire when the attributes of the discourse constituents match the attributes of the rules. Rules may be organized into sets of mutually exclusive rules, rule sets that are enabled only after other rules have fired or based on any other known or later developed rule sequence. In various embodiments according to this invention, multiple rules may be applied, with each rule associated with different weights.

The processor 30 then activates the relevance score determination routine or circuit 70 to determine the relevance scores for each discourse constituent. Measures of relevance may be determined based on statistics, keywords, knowledge bases or any known or later developed non-structural method.

The processor 30 activates the percolation routine or circuit 80 to percolate relevance scores from discourse constituent leaf nodes to preceding discourse constituent nodes. Initial relevance scores are percolated up through the structural representation of discourse. The supporting accessible discourse constituents necessary to ensure the grammaticality of the important discourse constituents are selected based on the relevance scores. In various exemplary embodiments, the non-structural relevance scores are percolated through the structural representation of discourse so that the grammaticality of the hybrid text summary is preserved. The number of supporting accessible discourse constituents is dynamically selectable based on text genre, language, function of the summary and/or any known or later developed attribute or features.

The display routine or circuit 90 is activated to determine discourse constituent nodes with relevance scores above the previously determined threshold importance score. In various other exemplary embodiments according to this invention, unique identified antecedent referents from supporting discourse constituents are substituted for anaphors into the leaf discourse constituent nodes to further compress the hybrid text summary.

FIG. 6 is an exemplary data structure for storing segmentation rules 600 according to an embodiment of this invention. The exemplary data structure for storing segmentation rules 600 is comprised of an identifier portion 610 that uniquely identifies each rule; one or more type portions 620 that categorize the different types of rules; a pattern portion 630 that specifies the constraints required to fire the rule and an action portion 640 for specifying the actions to be performed if the constraints for the rule are matched.

The segmentation rules define conditions for classifying a candidate segment as a discourse constituent and/or the main discourse constituents of a sentential unit. Discourse parsing involves segmenting the sentential units into discourse constituents, determining one or more main discourse constituents, determining a sub-tree of sentential discourse constituents depending from the main discourse constituents and determining an attachment of the sub-tree to an extant structural representation of discourse using attachment rules based on a theory of discourse. The attachment rules specify constraints on the sentential main discourse constituent and/or the attachment point discourse constituents. For example, different attachment rules are triggered depending on whether the discourse constituent is a modifier, a relative clause, a sentential subject and the like. It will be apparent that attributes or features of the candidate segments are determined from part-of-speech tags, environment variables, the output of the Xerox Linguistic Environment (XLE), a probabilistic, statistical, finite state or symbolic parser, a lexicon such as WordNet or any other known or later developed method of determining features of the candidate discourse constituents.

The first row of the exemplary data structure for storing segmentation rule information contains the value "1" in the identifier portion 610 and the value "Simple_Events" in the type portion 620. This indicates that the rule identified as rule "1" is a simple event type rule. In various exemplary embodiments according to this invention, rules may be grouped together into different sets of rules based on the values in the type portion 620. Different sets of rules and/or types may exclude and or enable various other rules constraining the sequence of rules that may fire after a given rule. In still other exemplary embodiments according to this invention, multiple rules may be applied, with each rule associated with different weights.

The pattern portion 630 contains the value "Simple_Event". This indicates that a simple event must be determined in the candidate segment before the rule will fire. It will be apparent that the determination of a simple event may be based on the output of a probabilistic, statistical, finite state or symbolic parser, a sentential parser, a linguistic processing environment such as the Xerox Linguistic Environment (XLE) or any known or later developed method.

The action portion 640 of the rule is activated if the pattern portion 630 is matched. The action portion 640 contains the value "BDU=TRUE" indicating that if the constraints of the pattern portion 630 are matched then the action portion of the rule is invoked to set a flag or other indication that the candidate segment is a basic discourse unit.

The second row of the exemplary data structure for storing segmentation rule information contains the value "2" in the identifier portion 610 and the value "Disclosure_Operator" in the type portion 620. This indicates that the rule identified as rule "2" is a disclosure operator type rule.

The pattern portion 630 contains the value "Modifier". This indicates that the candidate discourse constituent segment must be a modifier for the rule to fire. As discussed above, the determination of a modifier may be based on the output of a sentential parser, a linguistic processing environment and the like.

The action portion 640 of the rule is activated if the pattern portion 630 is matched. The action portion 640 contains the value "BDU=TRUE" indicating the action performed when the constraints of the pattern portion 630 are matched.

The third row of the exemplary data structure for storing segmentation rule information contains the value "3" in the identifier portion 610 and the value "Interpolations" in the type portion 620. This indicates that the rule identified as rule "3" is an interpolation type rule.

The pattern portion 630 contains the values "Appositive or Parenthetical or Interruption or Non_Restrictive_Clause or Reference". This indicates that if the candidate segment is determined to be an appositive, a parenthetical, an interruption, a non-restrictive clause or a reference then the rule will fire. As discussed above, constraints are determined based on the output of a probabilistic, statistical, finite-state, symbolic sentential parser, a linguistic processing environment such as the Xerox Linguistic Environment (XLE) or any known or later developed method.

The action portion 640 of the rule is activated if the pattern portion 630 is matched. The action portion 640 contains the value "BDU=TRUE" indicating that if the constraints of the pattern portion 630 are matched then the action portion of the rule is invoked to set a flag or other indication that the candidate segment is a basic discourse unit.

The fourth row of the exemplary data structure for storing segmentation rule information contains the value "4" in the identifier portion 610 and the value "Subordinate_Clauses" in the type portion 620. This indicates that the rule identified as rule "4" is a subordinate clause type of rule.

The pattern portion 630 contains the value "Complement_Clause or Sentential_Subject or Relative_Clause" indicating that the candidate segment must be a complement clause, a sentential subject or a relative clause before the rule will fire. The action portion 640 of the rule is activated if the pattern portion 630 is matched. The action portion 640 contains the value "BDU=TRUE" indicating that if the constraints contained in the pattern portion 630 are matched, the action portion of the rule is invoked to indicate that the candidate segment is a basic discourse unit.

The fifth row of the exemplary data structure for storing segmentation rule information contains the value "5" in the identifier portion 610 and the value "PostNominal_Modifier" in the type portion 620. This indicates that the rule identified as rule "5" is a postnominal modifier type of rule.

The pattern portion 630 contains the value "(Discrete_Event and (PostNominal_Modifer or Relative_Clause or Participial_Modifier))" This indicates that these constraints must be determined to be associated with the candidate segment before the rule will fire.

The action portion 640 of the rule is activated if the pattern portion 630 is matched. The action portion 640 contains the value "BDU=TRUE" indicating that if the constraints of the pattern portion 630 are matched then the action portion of the rule is invoked to set a flag or other indication that the candidate segment is a basic discourse unit.

The sixth row of the exemplary data structure for storing segmentation rule information contains the value "6" in the identifier portion 610 and the value "Morphological_Form" in the type portion 620. This indicates that the rule identified as rule "6" is a morphological type of rule. The pattern portion 630 contains the value "(Discrete_Event and (Infinitives or Gerunds))" indicating that the candidate segment must be determined to be a discrete event and either an infinitive or a gerund before the rule will fire.

The action portion 640 of the rule is activated if the pattern portion 630 is matched. The action portion 640 contains the value "BDU=TRUE" indicating that if the constraints of the pattern portion 630 are matched then the action portion of the rule is invoked to set a flag or other indication that the candidate segment is a basic discourse unit.

The seventh row of the exemplary data structure for storing segmentation rule information contains the value "7" in the identifier portion 610 and the value "Other_Predication" in the type portion 620. This indicates that the rule is identified as an other predication type of rule. The pattern portion 630 contains the value "Copular_Predication or Secondary_Predication or Discrete_Event". This indicates that a copular predication, secondary predication or a discrete event must be determined before the rule will fire.

The action portion 640 of the rule is activated if the pattern portion 630 is matched. The action portion 640 contains the value "BDU=TRUE" indicating that if the constraints of the pattern portion 630 are matched then the action portion of the rule is invoked to set a flag or other indication that the candidate segment is a basic discourse unit.

The eighth row of the exemplary data structure for storing segmentation rule information contains the value "8" in the identifier portion 610 and the value "Subordinating_Conjunctions" in the type portion 620. This indicates that the rule identified as rule "8" is a subordinating conjunction type of rule. The pattern portion 630 contains the value "(Subordinating_Conjunction and Discrete_Event)". This indicates that these constraints must be determined in the candidate segment before the rule will fire.

The action portion 640 of the rule is activated if the pattern portion 630 is matched. The action portion 640 contains the value "BDU=TRUE" indicating that if the constraints of the pattern portion 630 are matched then the action portion of the rule is invoked to set a flag or other indication that the candidate segment is a basic discourse unit.

The ninth row of the exemplary data structure for storing segmentation rule information contains the value "9" in the identifier portion 610 and the value "Coordinating_Conjunctions" in the type portion 620. This indicates that the rule identified as rule "9" is a coordinating conjunction type of rule. The pattern portion 630 contains the value "((Coordinating_Conjunction and Length=1) or (X Coordinating_Conjunction Y) and (X is a BDU) and (Y is a BDU))". This indicates that before the rule fires, a coordinating conjunction must be determined to be either 1) the only element in the candidate discourse constituent segment as indicated by the length=1; or 2) a coordinating conjunction that links elements X and Y, each of which is a BDU. If the candidate segment matches either of the specified constraints, the rule will fire.

The action portion 640 of the rule is activated if the pattern portion 630 is matched. The action portion 640 contains the value "BDU=TRUE" indicating that if the constraints of the pattern portion 630 are matched then the action portion of the rule is invoked to set a flag or other indication that the candidate segment is a basic discourse unit.

The tenth row of the exemplary data structure for storing segment rule information contains the value "10" in the identifier portion 610 and the value "Information_Structure" in the type portion 620. This indicates that the rule identified as rule "10" is an information structure type of rule. The pattern portion 630 contains the value "(Copula and (Cleft and Pseudo_Cleft))". This indicates that the candidate segment must be a copula and either a cleft or a pseudo-cleft before the rule will fire.

The action portion 640 of the rule is activated if the pattern portion 630 is matched. The action portion 640 contains the value "BDU=FALSE" indicating that if the constraints of the pattern portion 630 are matched then the action portion of the rule is invoked to set a flag or other indication that the candidate segment is not a basic discourse unit.

The eleventh row of the exemplary data structure for storing segment rule information contains the value "11" in the identifier portion 610 and the value "Event_Modifier" in the type portion 620. This indicates that the rule identified as rule "11" is an event modifier type of rule. The pattern portion 630 contains the value "(Event_Modifier and NOT(Discrete_Event))" indicating the candidate segment must be a modifier of and not be associated with a discrete event for the rule to fire.

The action portion 640 of the rule is activated if the pattern portion 630 is matched. The action portion 640 contains the value "BDU=FALSE" indicating that if the constraints of the pattern portion 630 are matched then the action portion of the rule is invoked to set a flag or other indication that the candidate segment is not a basic discourse unit.

The fourteenth row of the exemplary data structure for storing segment rule information contains the value "14" in the identifier portion 610 and the value "Initial_Modifier" in the type portion 620. This indicates that the fourteenth rule is an initial modifier type of rule. The pattern portion 630 contains the value "(Initial_Modifier and Scene_Setting)". This indicates that the candidate segment must be an initial modifier and be associated with scene setting to trigger a firing of the rule.

The action portion 640 of the rule is activated if the pattern portion 630 is matched. The action portion 640 contains the value "BDU=TRUE" indicating that if the constraints of the pattern portion 630 are matched then the action portion of the rule is invoked to set a flag or other indication that the candidate segment is not a basic discourse unit.

FIG. 7 is an exemplary data structure for storing attachment rule information 700 according to an embodiment of this invention. The exemplary data structure for storing attachment rules information 700 is comprised of an identifier portion 710 and a rule portion 720.

The first row of the exemplary data structure for storing attachment rule information contains "1" in the rule identifier portion 710. The rule portion 720 contains the compound rule '<Sx: (M-BDU/Type)="BetweenParenthesis"; St: AP is BottomOffree;>→Subordinate(AP, M-BDU)'. Rule "1" is a compound rule comprised of a first syntactic constraint denoted by 'Sx: (M-BDU/Type)="BetweenParenthesis"' indicating the main BDU is delimited by parentheses, and a second structural constraint "St: AP is BottomOfTree" indicating that the attachment point must be at the bottom of the open right tree of the structural representation of discourse. The first and second constraints are combined between the open constraints "<" and close constraints ">" tags indicating that both constraints must match to trigger the subordination of the main basic discourse unit (M-BDU) to the current attachment point indicated by the attachment point variable (AP).

The second row of the exemplary data structure for storing attachment rule information contains "2" in the rule identifier portion 710. The rule portion 720 contains the compound rule '<Sx: (AP/Tense)="Present"; Sx: (M-BDU/Tense="Past";>→Subordinate(AP, M-BDU)'. Rule "2" is a compound rule comprised of a first syntactic constraint denoted by 'Sx: (AP/Tense)="Present";' indicating the candidate attachment point discourse constituent must be in the present tense and a second syntactic constraint 'Sx: (M-BDU/Tense)="Past"' indicating that the main basic discourse constituent to be attached to the attachment point (AP) must be in the past tense to trigger the rule. The first and second constraints are combined between the open constraint "<" and close constraint ">" tags indicating that both constraints must match to trigger the subordination of the main basic discourse unit (M-BDU) to the current attachment point (AP).

The third row of the exemplary data structure for storing attachment rule information contains "3" in the rule identifier portion 710. The rule portion 720 contains the compound rule '<LS: (AP) is a (KB/Event); LS: (M-BDU) is a (KB/Event); Sx: (AP/Tense)=(M-BDU/Tense)>→Coordinate(AP, M-BDU)'. Rule "3" is a compound rule comprised of a first lexical-semantic constraint denoted by "LS: (AP) is a (KB/Event);". This indicates the candidate attachment point is associated with an event as determined by comparison to the knowledge base KB. The second lexical-semantic constraint "LS: (M-BDU) is a (KB/Event);" indicates that the main basic discourse unit is also associated with an event as determined by comparison to the knowledge base KB. A third, syntactic constraint "Sx: (AP/Tense)=(M-BDU/Tense)" indicates that the tense of the attachment point AP and the main basic discourse unit (M-BDU) must agree. The first, second and third constraints are combined between the open constraint "<" and close constraint ">" tags indicating that all three constraints must fire to trigger the coordination of the main basic discourse unit (M-BDU) and the current attachment point (AP).

The fourth row of the exemplary data structure for storing attachment rule information contains "4" in the rule identifier portion 710. The rule portion 720 contains the compound rule "<LS: (AP/Lexeme) has a (M-BDU/Lexeme: $1: $2; Sx: (AP/*/COMP) is $1; Sx: (M-BDU/*/SUBJ) is $2; >→Subordinate(AP, M-BDU)". Rule "4" is a compound rule comprised of a lexical-semantic constraint, followed by two syntactic constraints. The first, second and third constraints are combined between the open constraint "<" and close constraint ">" tags indicating that all three constraints must fire to trigger the subordination of the main basic discourse unit (M-BDU) to the current attachment point (AP).

The fifth row of the exemplary data structure for storing attachment rule information contains "5" in the rule identifier portion 710. The rule portion 720 contains the compound rule '<Sx: (M-BDU/Type)="Temporal"; St: M-BDU isSubordinatedTo AP;" >→CreateNary(Cx, AP, M-BDU)'. Rule "5" is a compound rule comprised of a first syntactic constraint denoted by 'Sx: (M-BDU/Type)="Temporal";'. This indicates the main basic discourse unit (M-BDU) discourse constituent must be a "Temporal" type of discourse constituent. The second syntactic constraint "Sx: M-BDU isSubordinatedTo AP;" indicates that the main basic discourse unit M-BDU is subordinated to the attachment point. The first and second constraints are combined between the open constraint "<" and close constraint ">" tags indicating that both constraints must match to trigger the coordination of the attachment point (AP) and the main basic discourse unit (M-BDU). The term "Cx" indicates coordination subtypes such as Question/Answer subtype coordinations and the like.

The sixth row of the exemplary data structure for storing attachment rule information contains "6" in the rule identifier portion 710. The rule portion 720 contains the compound rule '<Sm: Σ(AP) is "Generic"; Sm: Σ(M-BDU) is "Specific";>→Subordinate(AP, M-BDU)'. Rule "6" is a compound rule comprised of a first semantic constraint denoted by 'Sm: Σ(AP) is "Generic";'. This indicates the attachment point contains generic language elements. A second semantic constraint denoted by 'Sm: Σ(M-BDU) is "Specific";' indicates that the main basic discourse unit (M-BDU) contains specific language elements. The first and second constraint are combined between the open constraint "<" and close constraint ">" tags indicating that both constraints must match to trigger the subordination of the main basic discourse unit (M-BDU) to the current attachment point indicated by the variable AP.

The seventh row of the exemplary data structure for storing attachment rule information contains "7" in the rule identifier portion 710. The rule portion 720 contains the compound rule '<Sm: Σ(AP) is "Irrealis"; Sm: Σ(M-BDU) is "Realis"; Sx: if AP then M-BDU; >→CreateNary(HYP, AP, M-BDU)'. Rule "7" requires that the AP be "Irrealis" and the main basic discourse constituent be "Realis" and the structural constraint that the attachment point (AP) match before the rule is fired to create the n-ary relationship between the attachment point and the main basic discourse constituent. Similarly, rows eight through twelve describe other Unified Linguistic Discourse Model attachment rules useful in determining a structural representation of discourse.

The ninety-ninth row of the exemplary data structure for storing attachment rule information contains "99" in the rule identifier portion 710. The rule portion 720 contains the compound rule '<St: AP is BottomOfTree; Px: Ifnot Anyrule applies;>→Subordinate(AP, M-BDU)'. Rule "7" is a compound rule comprised of a first structural constraint "St: AP is BottomOfTree"indicating the candidate attachment point must occur at the bottom of the tree. A preemptor constraint "Px: IfnotAnyrule applies;" is matched only if no other constraints apply. The first and second constraints are combined between the open constraint "<" and close constraint ">" tags indicating that both constraints must match to trigger the subordination of the main basic discourse unit (M-BDU) to the current attachment point (AP).

Figure 8:
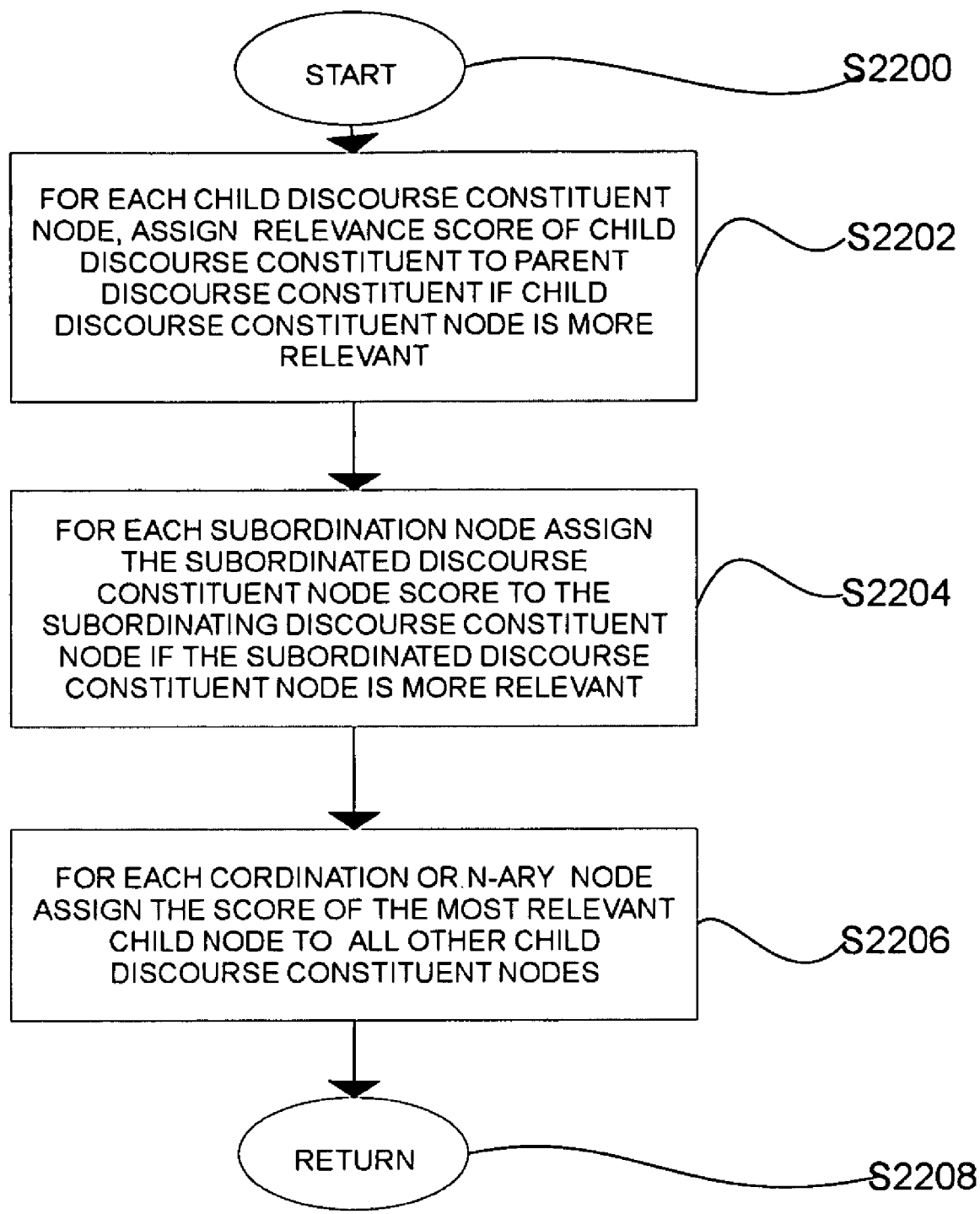
FIG. 8 is an expanded view of a first exemplary method of percolating relevance scores according to an embodiment of this invention.

FIG. 8 is an expanded view of a first exemplary method of percolating relevance scores according to an embodiment of this invention. The process begins at step S2200 and immediately continues to step S2202.

In step S2202, the relevance score of each discourse constituent child node is assigned to the parent discourse constituent node. This percolates the relevance scores of important discourse constituents to the supporting preceding discourse constituent nodes and helps preserve the grammaticality of the resultant hybrid text summary. Control then continues to step S2204.

In step S2204, the relevance score of each subordinated node is assigned to the subordinating discourse constituent if the relevance score of the subordinated discourse constituent node is more relevant. This ensures that supporting subordinating discourse constituent nodes are included in the hybrid text summary. Control then continues to step S2206 where the relevance score of each coordination or n-ary node is assigned to all the coordinated child discourse constituent nodes if the relevance score is more relevant. This ensures that all the coordination information is captured. Control then continues to step S2208 and immediately jumps to step S2300 of FIG. 4.

Figure 9:
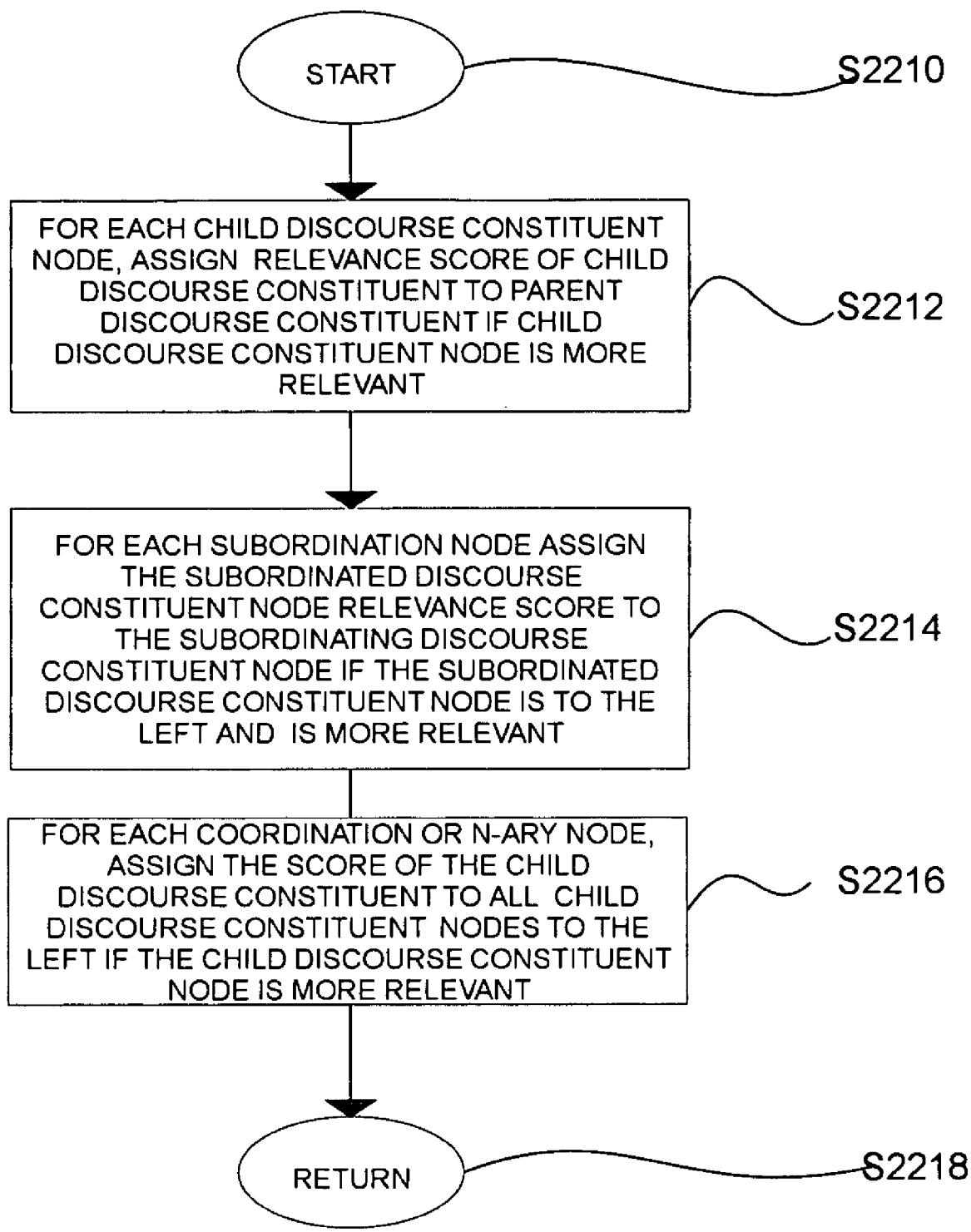
FIG. 9 is an expanded view of a second exemplary method of percolating relevance scores according to an embodiment of this invention.

FIG. 9 is an expanded view of a second exemplary method of percolating relevance scores according to an embodiment of this invention. The process begins at step S2210 and immediately continues to step S2212.

The relevance score of each discourse constituent child node is assigned to the parent discourse constituent node in step S2212. This percolates the relevance scores of the important discourse constituents to the supporting preceding discourse constituent nodes and helps preserve the grammaticality of the resultant hybrid text summary. Control then continues to step S2214.

In step S2214, the relevance score of each subordinated node is assigned to the subordinating discourse constituent if the relevance score of the subordinated discourse constituent node is more relevant and the node appears to the left of the subordinated node. This ensures that supporting subordinating discourse constituent nodes are included in the hybrid text summary but further constrains the addition of supporting discourse constituents to discourse constituents on the left. In the structural representation of the Linguistic Discourse Model, the left child node of a subordination node is the subordinating node. However, it will be apparent that due to differences in the structural representation of discourse associated with various other theories of discourse analysis, other methods of identifying the supporting preceding discourse constituent information may be used without departing from the scope of this invention. Control then continues to step S2216 where for each coordination or n-ary or binary discourse constituent node, more relevant relevance scores of child discourse constituents are assigned to all child discourse constituents to the left. Control then continues to step S2218 and immediately jumps to step S2300 of FIG. 4.

Figure 10:
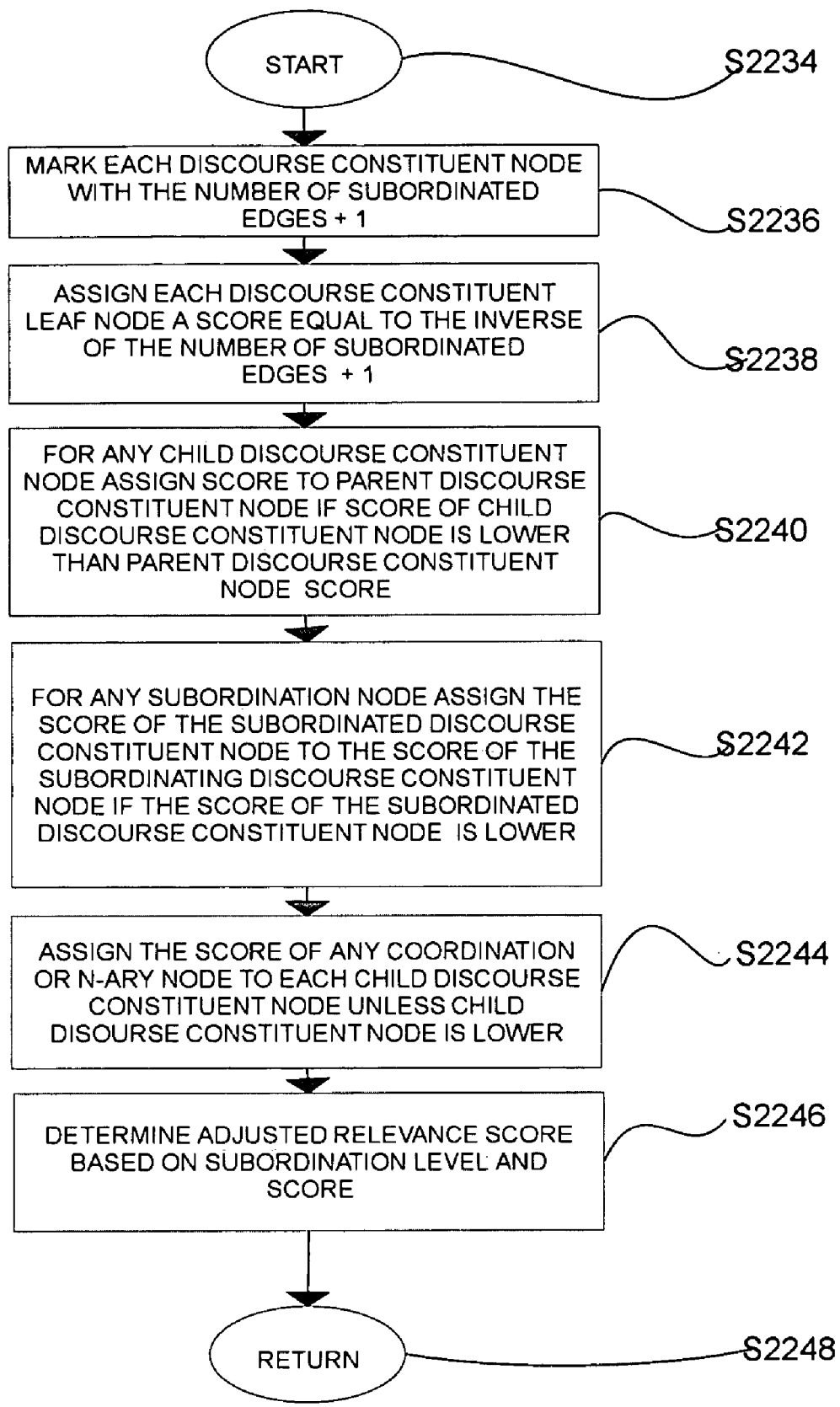
FIG. 10 is an expanded view of a third exemplary method of percolating relevance scores according to an exemplary embodiment of this invention.

FIG. 10 is an expanded view of a third exemplary method of percolating relevance scores according to an exemplary embodiment of this invention. The process begins at step S2234 and immediately continues to step S2236.

In step S2236, each discourse constituent node is marked with the number of subordinated edges between the discourse constituent node and the root node plus one. This reflects the level of the node in the structural representation of discourse. After the level of each discourse constituent node is marked, control continues to step S2238.

In step S2238, each terminal child or leaf node discourse constituent is assigned a score equal to the inverse of the number of subordinated edges in the structural representation of discourse. After the score is determined for each node, control continues to step S2240.

In step S2240, the lower scores are percolated through the structural representation of discourse. Thus, the score is assigned to the parent node, if the score of the parent node is more relevant than the child node. Control then continues to step S2242.

The score of any subordinated node is assigned to the subordinating node if the subordinated score is lower in step S2242. Control then continues to step S2244. In step S2244, the score of any coordination or n-ary node is assigned to each child node unless the child node has a lower score. Control then continues to step S2246.

In step S2246, the adjusted relevance score for each of the discourse constituent nodes is determined based on the subordination level and the score. An exemplary relevance score is determined based on the formula:

$$r = 1 - (L-1)*i \qquad (1)$$

where L is the subordination level of the node and i is the score assigned to each node. The term "−1" is added to make the relevance score a real value with lower numbers associated with less relevance. The root node has relevance "1" and leaf nodes have an initial relevance score of 1/L. After determining the relevance scores, control continues to step S2248 and immediately jumps to step S2300 of FIG. 4.

Figure 11:
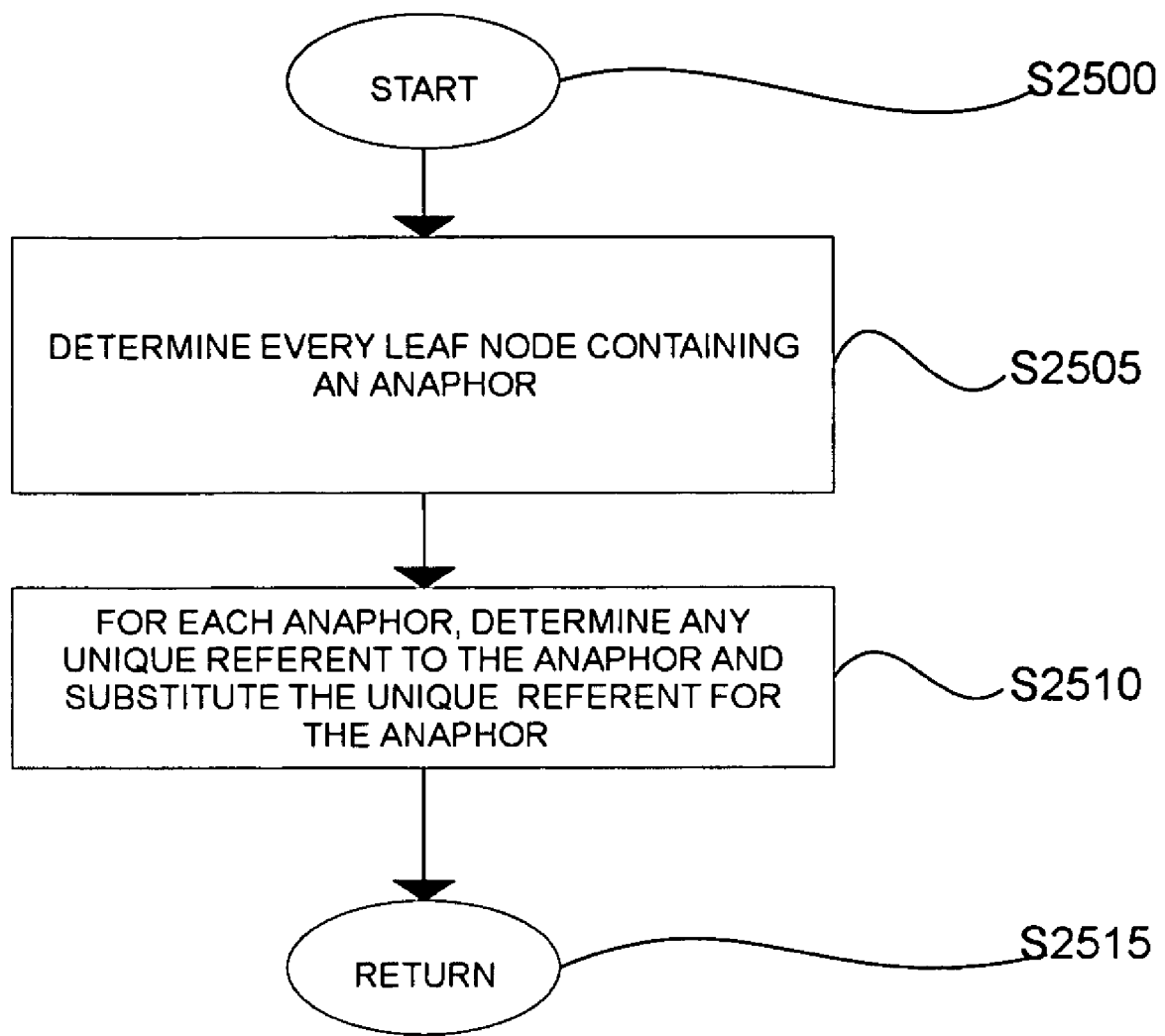
FIG. 11 is an expanded view of a first exemplary method of anaphora substitution according to an embodiment of this invention.

FIG. 11 is an expanded view of a first exemplary method of anaphora substitution according to an embodiment of this invention. The process begins at step S2500 and immediately continues to step S2505 where each discourse constituent child node that contains an anaphor, such as a pronoun, is determined. Control then continues to step S2510.

In step S2510, any unique antecedent referents for the anaphors are determined. It will be apparent that anaphors such as pronouns usually follow their referent. Thus, any unique antecedent referent for the anaphor or pronoun usually occurs before the anaphor or pronoun in the structural representation of discourse. This reduces the number of preceding discourse constituents that must be examined. Any determined unique antecedent referents are then substituted for the anaphor or pronouns. Control then continues to step S2515 and then immediately jumps to step S2600 of FIG. 4.

Figure 12:
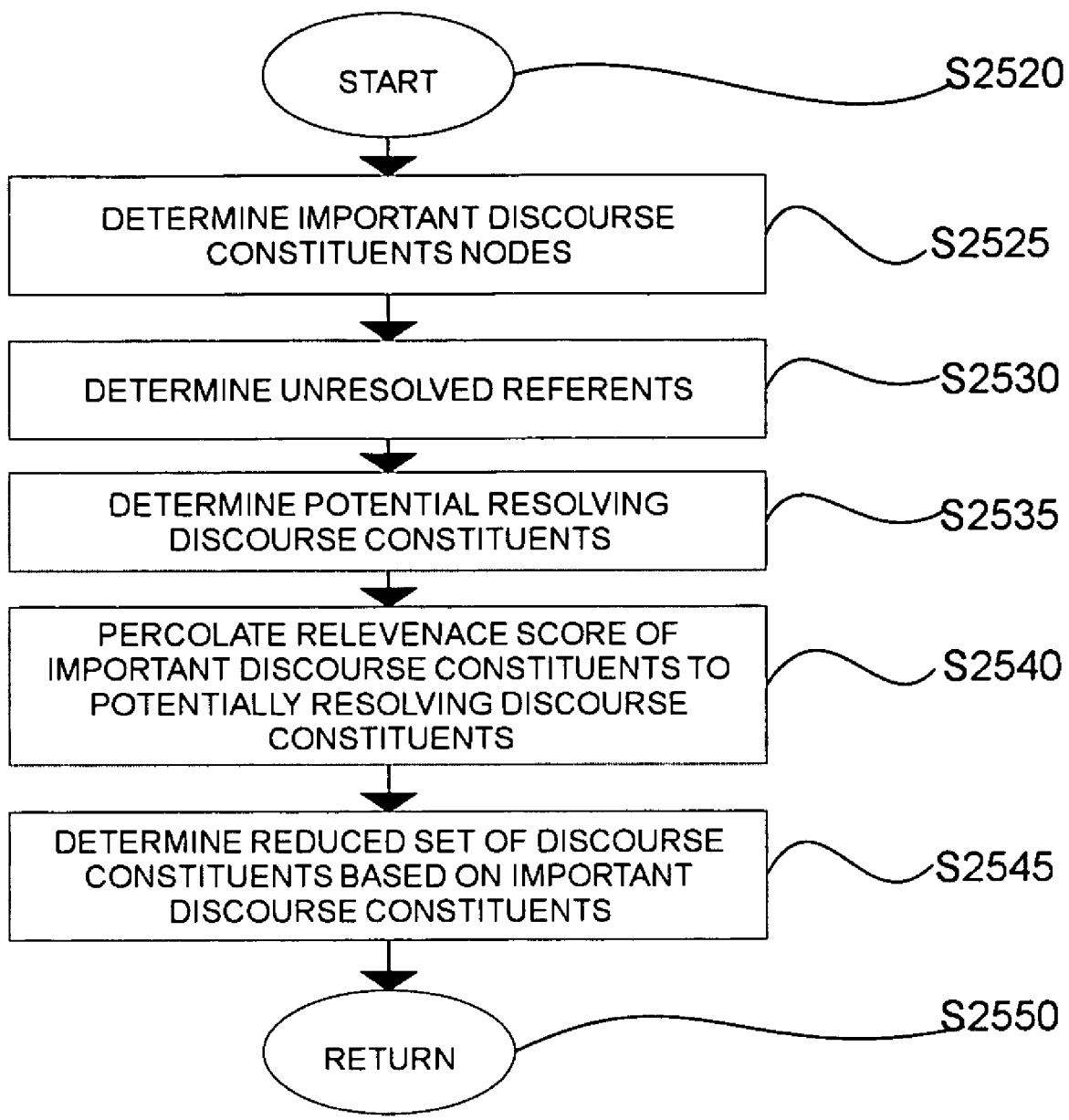
FIG. 12 is an expanded view of a second exemplary method of anaphora substitution according to an embodiment of this invention.

FIG. 12 is an expanded view of a second exemplary method of anaphora substitution according to an embodiment of this invention. The process begins at step S2520 and immediately continues to step S2525.

The important discourse constituents are determined in step S2525. The important discourse constituents are typically determined in the prior steps and retrieved. However important discourse constituents may also be determined dynamically using statistics, keywords, knowledge bases and the like. After the important discourse constituents are determined, control continues to step S2530.

The unresolved anaphors in the important discourse constituents are then determined in step S2530. For example, any pronouns in the important discourse constituents are flagged as unresolved anaphors. Control then continues to step S2535.

In step S2535, the potential resolving preceding discourse constituents are determined. Any discourse constituents that contains a potential antecedent referent of a pronoun or other unresolved anaphor is a potential resolving preceding discourse constituent. In various exemplary embodiments according to this invention, the potentially resolving preceding discourse constituents are determined based on WordNet relations, ontologies or any other method of relation chaining. After the potential resolving preceding discourse constituents are determined, control continues to step S2540.

The relevance scores of important discourse constituents are percolated through the determined potential resolving preceding discourse constituents in step S2540. Percolating relevance scores through the potential resolving preceding discourse constituents may reduce the scope of branching to be considered. This frequently results in a more condensed hybrid text summary. Control then continues to step S2545.

In step S2545, the reduced set of discourse constituents is determined based on the important discourse constituents, the structural representation of discourse and the relevance scores. The percolation channels are limited to discourse constituents that can potentially resolve anaphor in the importance discourse constituents. After the reduced set of discourse constituents is selected as the hybrid text summary, control continues to step S2550 and immediately jumps to step S2600 of FIG. 4.

Figure 13:
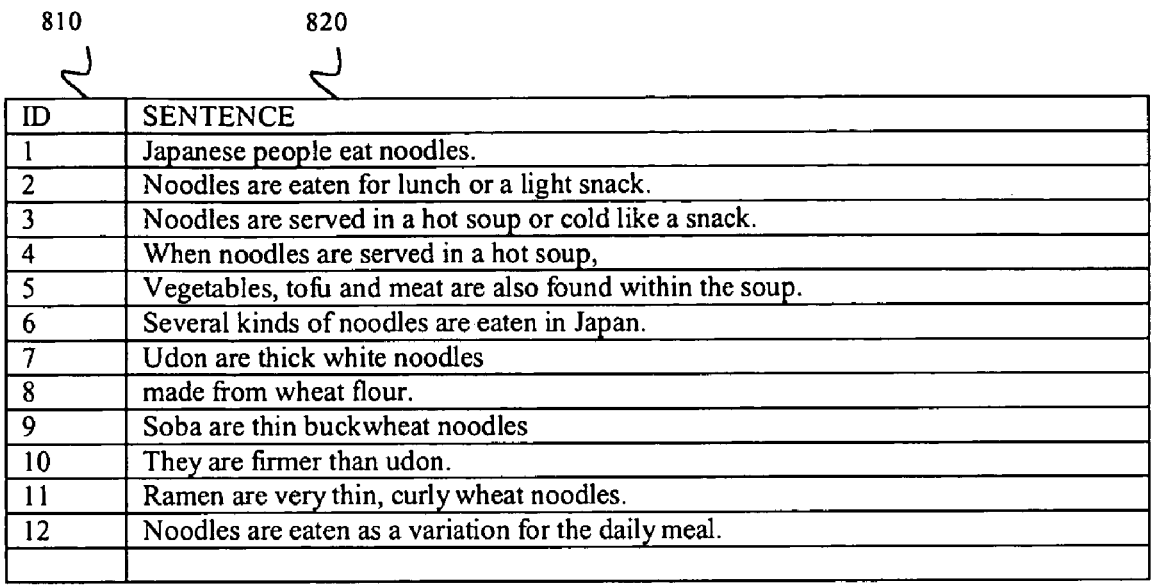
FIG. 13 is a text to be summarized.

FIG. 13 is a text to be summarized. The text is comprised of twelve sentences.

Figure 14:
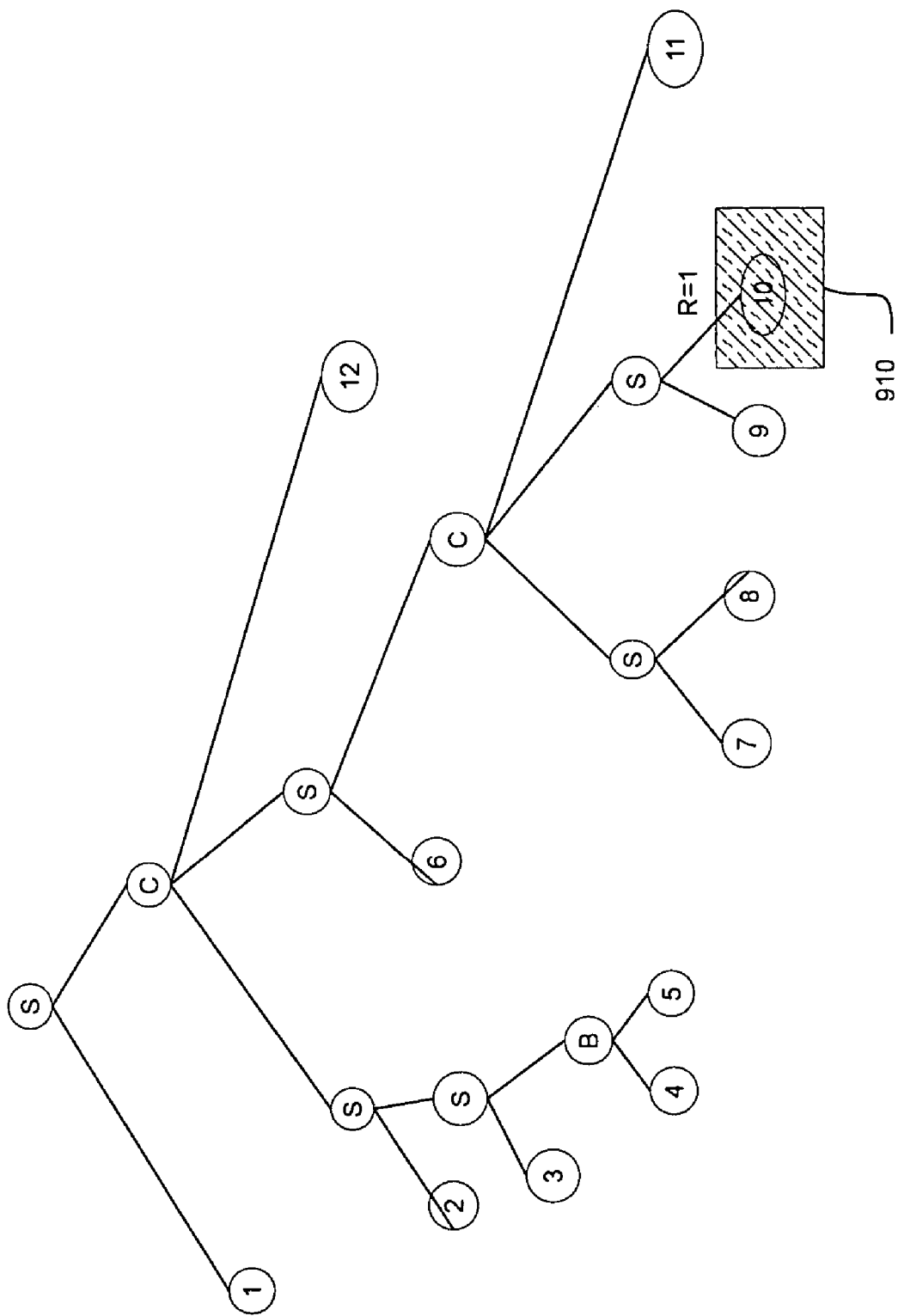
FIG. 14 is an exemplary structural representation of discourse for the text to be summarized.

FIG. 14 is an exemplary structural representation of discourse for the text to be summarized. The exemplary structural representation of discourse is comprised of conjoined discourse constituents. Line 10 of the exemplary text is indicated as the important discourse constituent 910. Discourse constituents may be determined as important based on statistics, keywords, knowledge bases or any other non-structural measure of importance.

Figure 15:
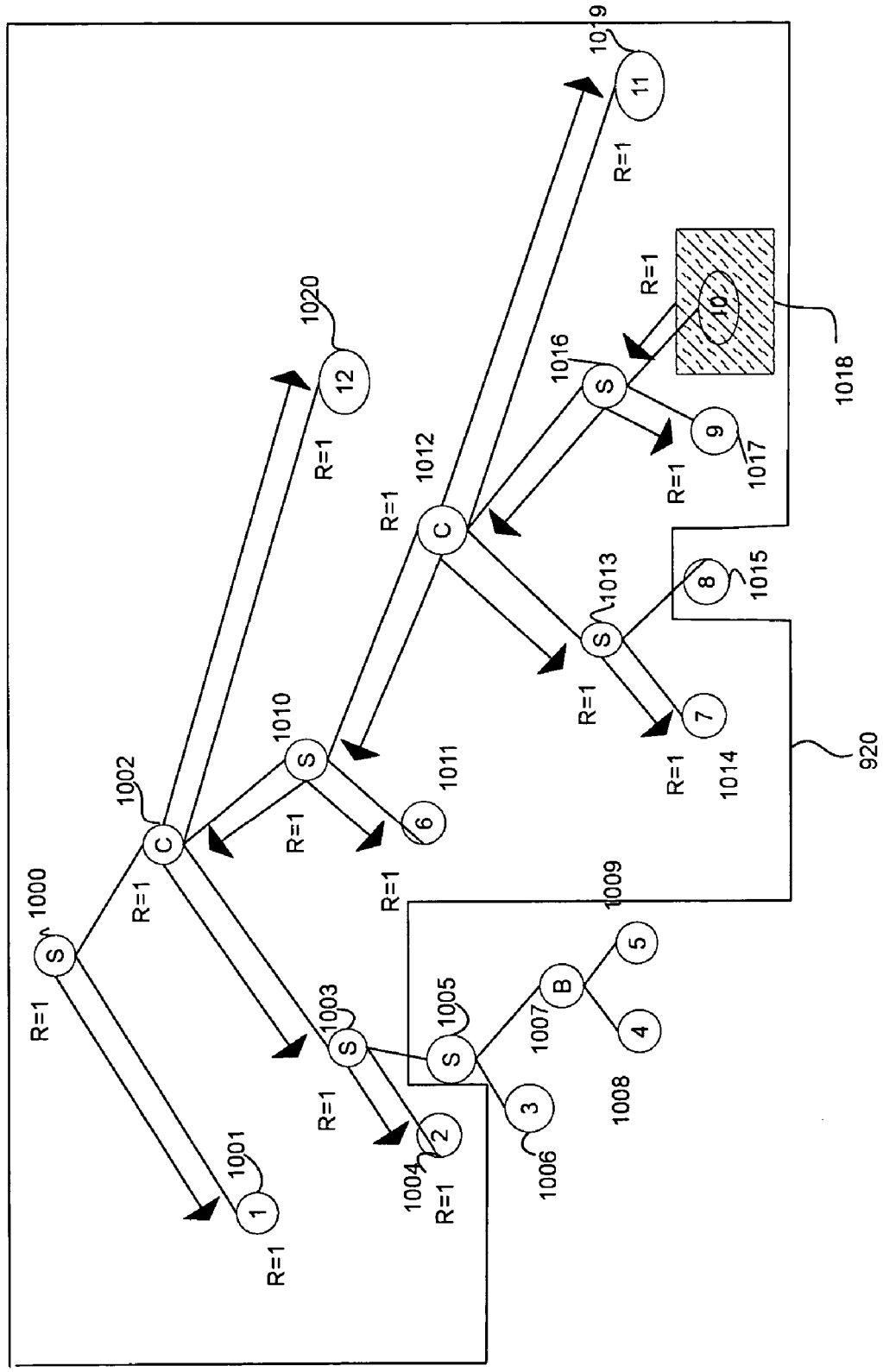
FIG. 15 is an exemplary structural representation of discourse showing a first exemplary method of percolating relevance scores according to this invention.

FIG. 15 is an exemplary structural representation of discourse showing a first exemplary method of percolating relevance scores according to this invention. An important discourse constituent 1018 is identified based on some non-structural measure of relevance. The arrows indicate the percolation of the relevance score information indicated by an R value of "1" through a structural representation of discourse. Since the relevance score for the important discourse constituent 1018 is a child, relevance scores of more relevant child discourse constituents are assigned to the parent discourse constituent nodes. Since the important discourse constituent 1018 is the most relevant discourse constituent node, as determined by the selected non-structural measure of relevance, the relevance score of the important discourse constituent 1018 is assigned to the parent subordination node 1016. The relevance score of the parent node is in turn assigned to the coordination node 1012, the subordination node 1010, the coordination node 1002 and the root subordination node 1000 based on the same rationale.

Each of the subordinating discourse constituent nodes 1001, 1004, 1011, 1014 and 1017 are assigned the relevance scores of the subordinated discourse constituent as indicated by the arrows. The relevance score of the most relevant child node is assigned to each of the coordination nodes. The coordination nodes 1002 and 1012 are included based on their status as parent nodes of the important discourse constituent. The relevance score is then percolated to the children of each of the identified coordination nodes 1002 and 1012. Thus, subordination nodes 1013 and 1011 and leaf nodes 1019 and 1020 are also assigned the relevance score. Each discourse constituent with a most relevant relevance score is selected for the hybrid text summary.

Figure 16:
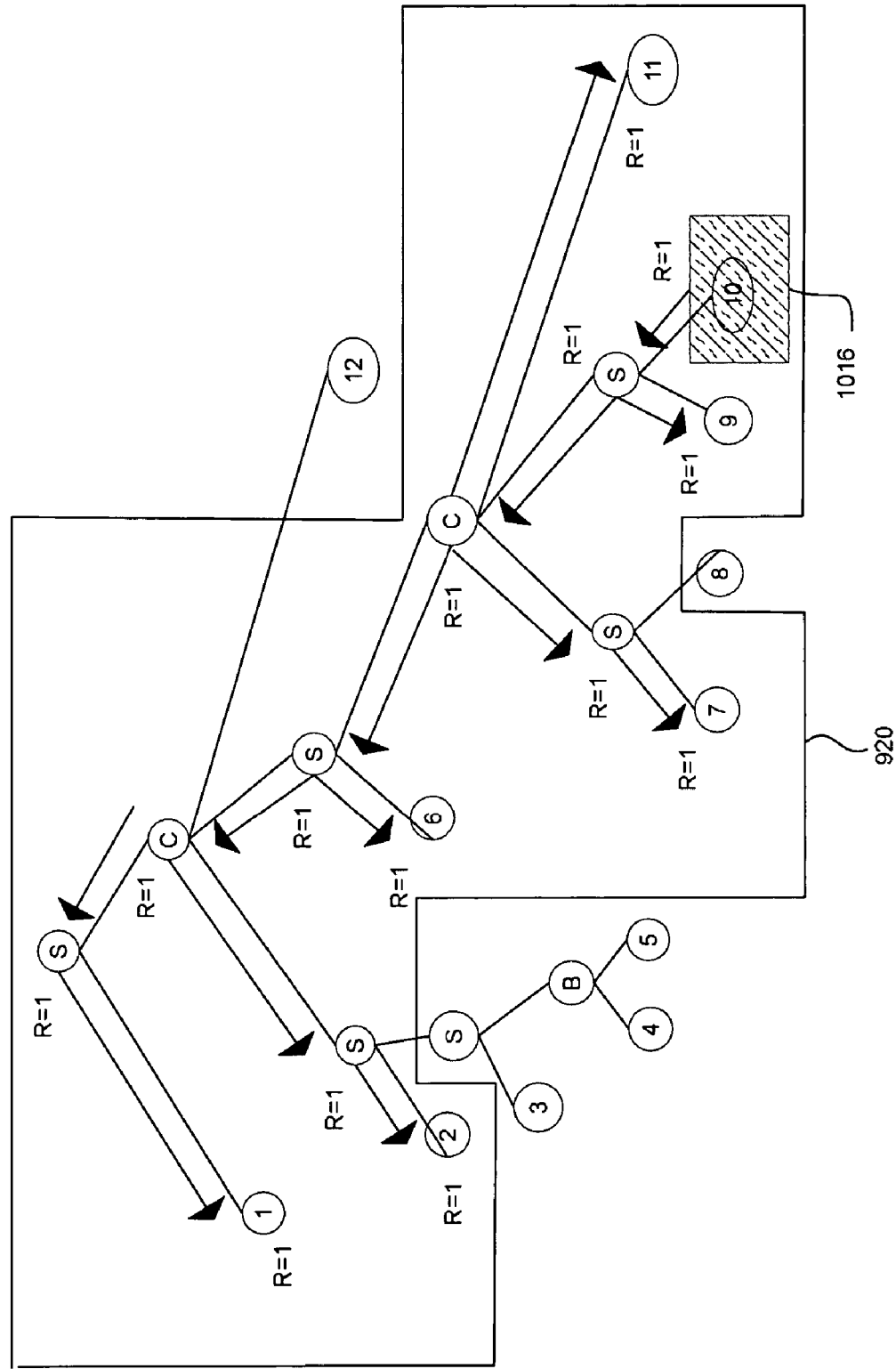
FIG. 16 is an exemplary structural representation of discourse showing a second exemplary method of percolating relevance scores according to this invention.

FIG. 16 is an exemplary structural representation of discourse showing a second exemplary method of percolating relevance scores according to this invention. An important discourse constituent 1016 is determined based on one or more non-structural measures of relevance. The percolation differs from the method described above in the treatment of the coordination and binary child nodes. More relevant relevance scores of the children of coordination or binary nodes are assigned to each preceding sibling. This reduces the number of included discourse constituents in the hybrid text summary 920.

Figure 17:
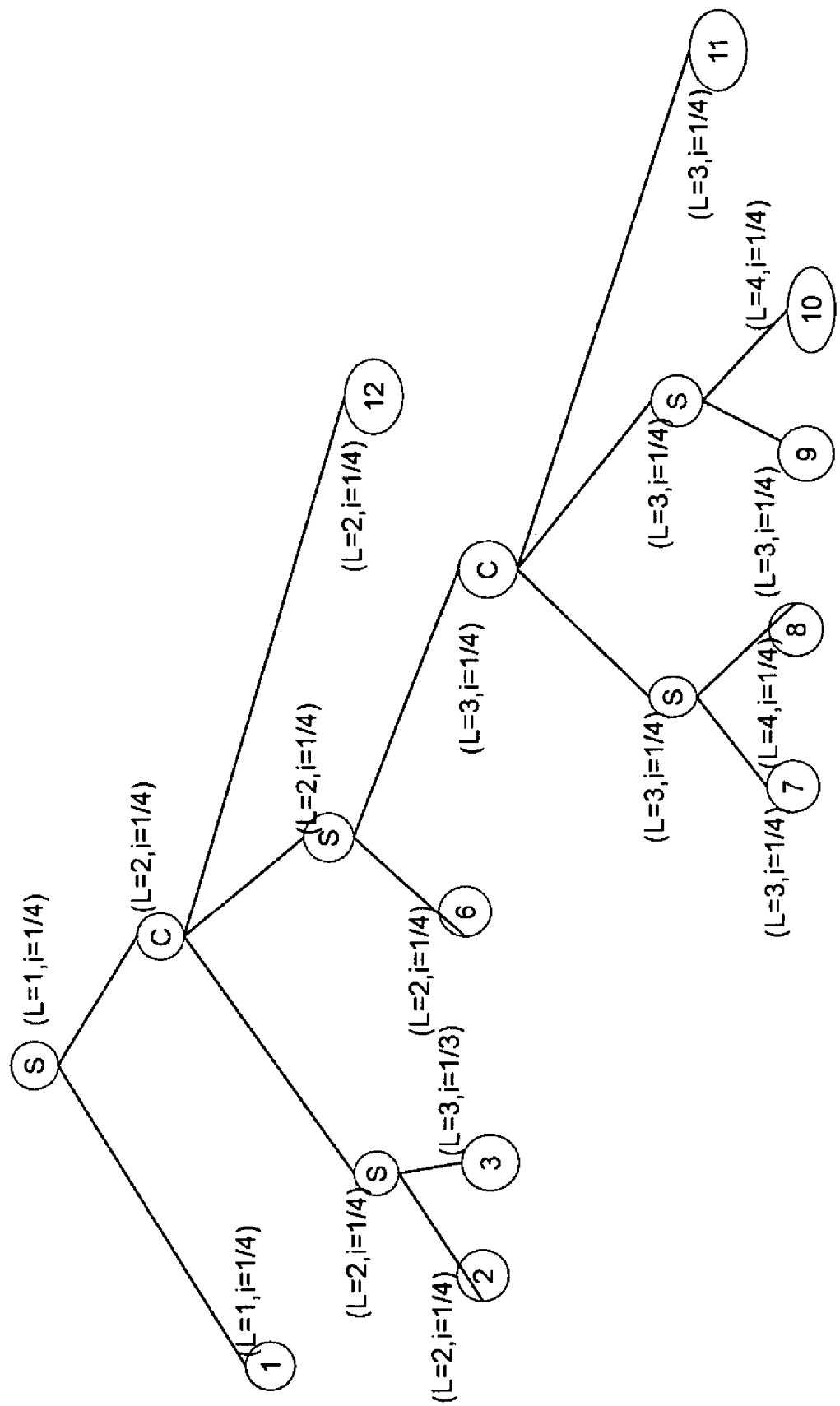
FIG. 17 is a first view of an exemplary structural representation of discourse showing a third exemplary method of percolating inverse scores according to this invention.

FIG. 17 is a first view of an exemplary structural representation of discourse showing a third exemplary method of percolating inverse scores according to this invention. Lines 4 and 5 of the exemplary text have been omitted for illustrative purposes. Each of the discourse constituents is marked with the subordination level L based on the number of subordinated edges plus 1. Each leaf node is assigned a score "i", equal to the inverse of the subordination level.

$$i = 1/L \quad (2)$$

Lower values of the score are then percolated through the structural representation of discourse based on the following rules. For any node with a score "i", assign the score to the parent if the parent does not have a lower score. For any subordination node with score "i", assign the score to the subordinating child node, if the score of the subordinating child node is not lower. For any coordination or binary node with score "i", assign the score "i" to each child node if the child node does not have a lower score. A relevance score is then determined based on the score and the subordination level such as:

$$r = 1 - (L-1) * i \quad (3)$$

where r is the relevance score, L is the subordination level, and "i" is the score 1/L.

Figure 18:
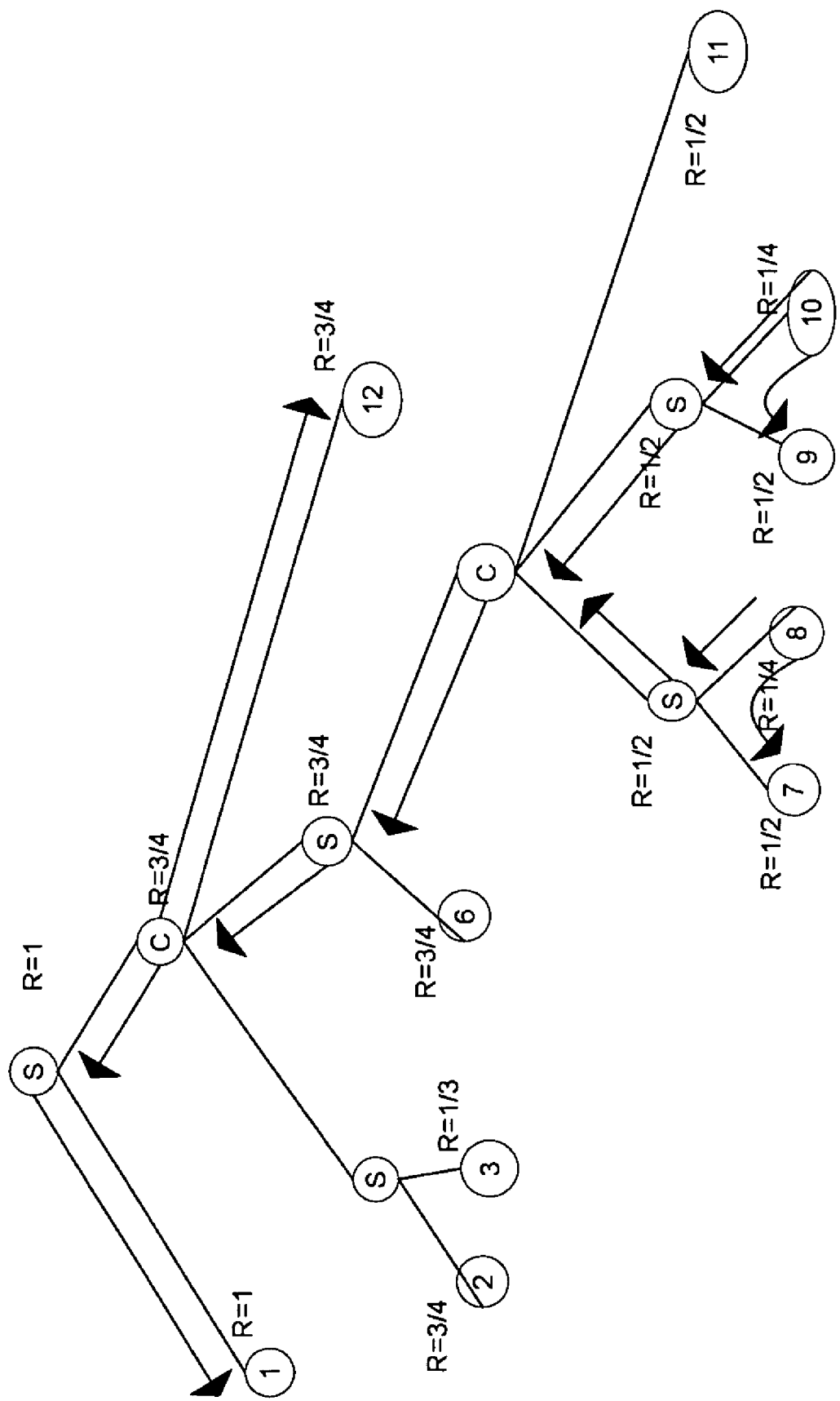
FIG. 18 is a second view of the exemplary structural representation of discourse showing the third exemplary method of percolating inverse scores according to this invention.

FIG. 18 is a second view of the exemplary structural representation of discourse showing the third exemplary method of percolating inverse scores according to this invention. Associated relevance scores are then determined based on equation (3) or some other function.

Figure 19:
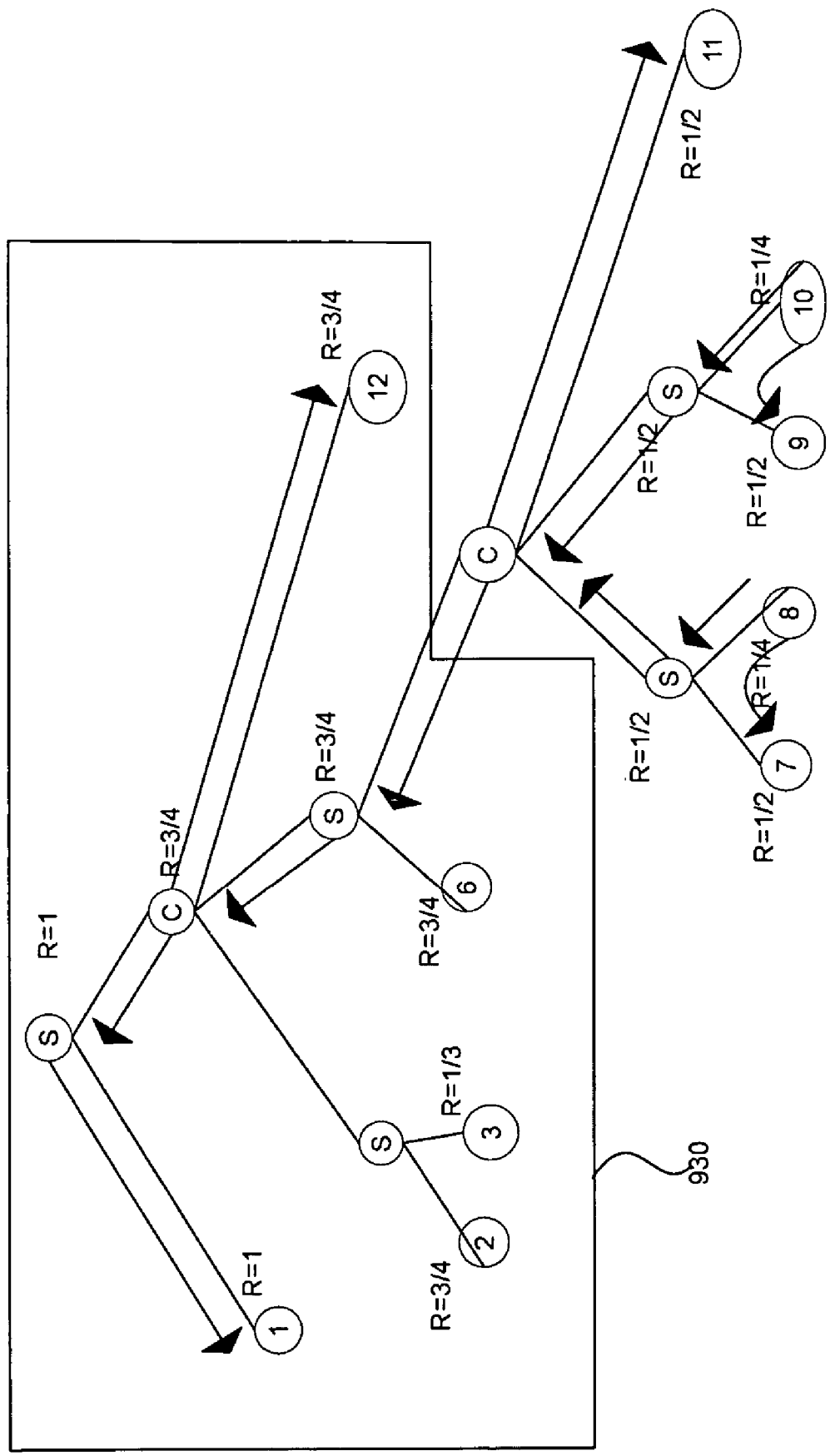
FIG. 19 is a third view of the exemplary structural representation of discourse showing an exemplary method of selecting discourse constituents for a hybrid text summary based on a threshold importance level according to this invention.

FIG. 19 is a third view of the exemplary structural representation of discourse showing an exemplary method of selecting discourse constituents for a hybrid text summary based on a threshold importance level according to this invention. Lines 4 and 5 of the exemplary text have been omitted for illustrative purposes. An importance threshold relevance level of "½" has been specified. The hybrid text summary 930 is comprised of discourse constituents associated with relevance scores above the "½" threshold relevance level.

Figure 20:
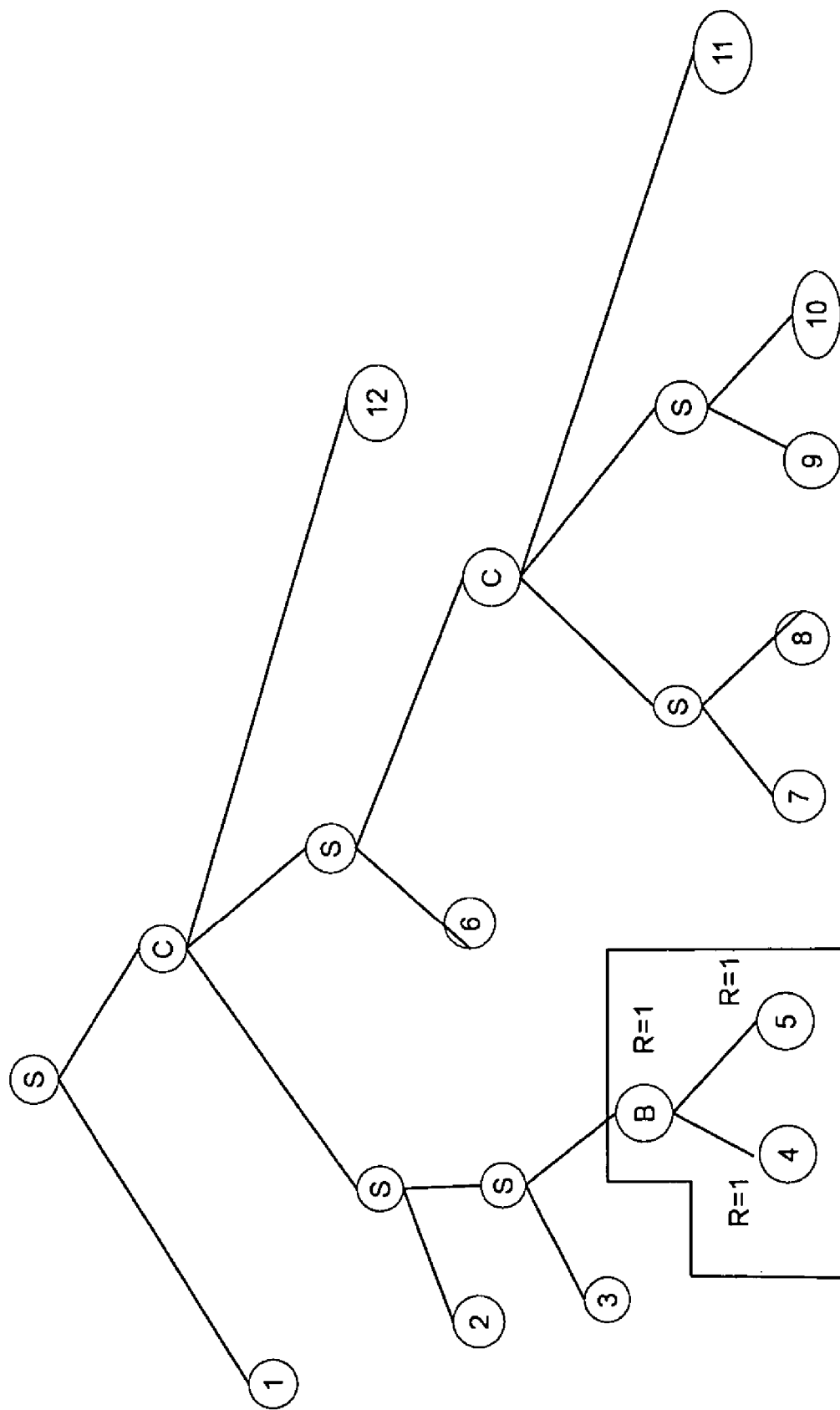
FIG. 20 is a first view of the exemplary structural representation of discourse showing percolation of relevance scores based on anaphor resolution according to this invention.

FIG. 20 is a first view of the exemplary structural representation of discourse showing percolation of relevance scores based on anaphor resolution according to this invention. Line 5 is identified as an important discourse constituent. In this method, relevance scores are restrictively percolated so that the adjustment of a discourse constituent relevance score occurs only if the discourse constituent can potentially resolve referents in the selected leaf discourse constituent node. Thus, line 4 is added since the term "a hot soup" potentially resolves the reference in line 5 to "the soup". However, adding line 4, introduces the referent "they". The term "they" is resolved by percolating the relevance score to line 3. Line 3 contains the term "Noodles", which uniquely identifies the referent. In various other exemplary embodiments according to this invention, the term "Noodles" may be substituted into line 4 to form a further compressed hybrid text summary 923.

Each of the circuits 10-90 of the hybrid summarization systems 100-110 described in FIGS. 3 and 5 can be implemented as portions of a suitably programmed general-purpose computer. Alternatively, 10-90 of the hybrid summarization systems 100-110 outlined above can be implemented as physically distinct hardware circuits within an ASIC, or using a FPGA, a PDL, a PLA or a PAL, or using discrete logic elements or discrete circuit elements. The particular form each of the circuits 10-90 of the hybrid summarization systems 100-110 outlined above will take is a design choice and will be obvious and predicable to those skilled in the art.

Moreover, the hybrid summarization systems 100-110 and/or each of the various circuits discussed above can each be implemented as software routines, managers or objects executing on a programmed general purpose computer, a special purpose computer, a microprocessor or the like. In this case, the hybrid summarization systems 100-110 and/or each of the various circuits discussed above can each be implemented as one or more routines embedded in the communications network, as a resource residing on a server, or the like. The hybrid summarization systems 100-110 and the various circuits discussed above can also be implemented by physically incorporating the hybrid summarization systems 100-110 into software and/or a hardware system, such as the hardware and software systems of a web server or a client device.

As shown in FIGS. 3 and 5, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, 3 and 5 can each be any known or later developed device or system for connecting a communication device to the hybrid summarization systems 100-110, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of determining a hybrid text summary by a hybrid summarization system having a processor, a relevance score determination module, a structural representation of the discourse determination module and a percolation module, the method comprising:

determining discourse constituents for a text by the processor;

determining a structural representation of discourse for the text by the structural representation of the discourse determination module;

determining relevance scores for discourse constituents based on at least one non-structural measure of relevance by the relevance score determination module;

percolating relevance scores based on the structural representation of discourse by the percolation module; and determining a hybrid text summary, by the processor, based on discourse constituents with relevance scores compared to a threshold relevance score, wherein percolating the relevance scores comprises:

for each child discourse constituent node in the structural representation, assigning the relevance score of the child discourse constituent node to the parent discourse constituent node if the child discourse constituent node is more relevant;

for any subordinating nodes, assigning the relevance scores of the subordinated discourse constituent to the subordinating discourse constituent if the subordinated discourse constituent is more relevant; and for any coordination nodes, assigning the relevance score of the most relevant child to other child discourse constituent nodes.

2. The method of claim 1, wherein the structural representation of discourse is determined based on a theory of discourse analysis.

3. The method of claim 2, wherein the theory of discourse analysis is at least one of the Linguistic Discourse Model, the Unified Linguistic Discourse Model, Rhetorical Structure Theory, Discourse Structure Theory and Structured Discourse Representation Theory.

4. The method of claim 1, wherein non-structural measures of relevance are determined based on at least one of statistics, keywords, knowledge bases.

5. The method of claim 1, further comprising the steps of:
determining every leaf discourse constituent containing an anaphor;
for each anaphor, determine any unique antecedent referents for the anaphor;
substituting the unique antecedent referent into the leaf discourse constituent for the anaphor;
removing the discourse constituent containing the unique antecedent referent from the set of the discourse constituents with relevance scores more relevant that the threshold relevance score.

6. A method of determining a hybrid text summary by a hybrid summarization system having a processor, a relevance score determination module, a structural representation of the discourse determination module and a percolation module, the method comprising:
determining discourse constituents for a text by the processor;
determining a structural representation of discourse for the text by the structural representation of the discourse determination module;
determining relevance scores for discourse constituents based on at least one non-structural measure of relevance by the relevance score determination module;
percolating relevance scores based on the structural representation of discourse by the percolation module; and
determining a hybrid text summary, by the processor, based on discourse constituents with relevance scores compared to a threshold relevance score,
wherein percolating the relevance scores comprises:
for each child discourse constituent node in the structural representation, assigning the relevance score of the child discourse constituent node to the parent discourse constituent node if the child discourse constituent node is more relevant than its parent;
for each coordinated discourse constituent node, assigning the relevance score of the coordinated discourse constituent node to each preceding less relevant sibling node; for each child discourse constituent node that is not a coordinated discourse constituent node and is not a subordinated discourse constituent node, assigning the relevance score of the parent discourse constituent node to the child discourse constituent node if the parent discourse constituent is more relevant than the child;
for each coordinated discourse constituent node, assigning the relevance score of the parent discourse constituent node to the coordinated discourse constituent node, if the coordinated discourse node and all its siblings are less relevant than the parent node;
for each subordinated discourse constituent node, assigning the relevance score of the subordinated discourse constituent node to the subordinating discourse constituent if the subordinated discourse constituent is more relevant than the subordinating node; and
for each node, repeating these steps, until no node can be found whose relevance score is changed to the relevance score of another node.

7. The method of claim 6, wherein the percolation of relevance scores is applied to progressively larger sets of linked nodes.

8. A method of determining a hybrid text summary by a hybrid summarization system having a processor, a relevance score determination module, a structural representation of the discourse determination module and a percolation module, the method comprising:
determining discourse constituents for a text by the processor;
determining a structural representation of discourse for the text by the structural representation of the discourse determination module;
determining relevance scores for discourse constituents by the relevance score determination module;
percolating relevance scores by the percolation module based on the structural representation of discourse comprising:
for each discourse constituent leaf node, determining the number of subordinated edges plus one;
determining a score based on the inverse of the number of subordinated edges +1;
for each discourse constituent node, assigning the score of a child discourse constituent node to the parent discourse constituent node, if the score is less relevant;
for any subordination discourse constituent node, assigning the score of the subordinated discourse constituent node to the subordinating discourse constituent node if the subordinated discourse constituent score is lower;
assigning the relevance scores of any coordination discourse constituent node to each child discourse constituent of the coordination if it is lower;
determining an adjusted relevance score based on the score and the subordination level; and
determining a hybrid text summary, by the processor, based on discourse constituents with relevance scores compared to a threshold relevance score.

9. The method of claim 8, further comprising the steps of:
determining a combined relevance score based on the relevance scores and non-structural relevance scores and percolating the combined relevance score.

10. A system for determining hybrid text summaries comprising:
an input/output circuit for retrieving a text;
a processor for determining discourse constituents for the text and attaching the discourse constituents into a structural representation of discourse;
a relevance score determination circuit for determining relevance scores for the discourse constituents based on at least one non-structural measure of relevance; and
a percolation circuit for percolating discourse constituent relevance scores based on the structural representation of discourse and where the processor determines a hybrid text summary based on the discourse constituents with relevance scores exceeding a threshold relevance score,
wherein, for each child discourse constituent node in the structural representation, the percolation circuit assigns the relevance score of the child discourse constituent node to the parent discourse constituent node if the child discourse constituent node is more relevant;
for any subordinating nodes, the percolation circuit assigns the relevance scores of the subordinated discourse constituent to the subordinating discourse constituent if the subordinated discourse constituent is more relevant; and
for any coordination nodes, the percolation circuit assigns the relevance score of the most relevant child to other child discourse constituent nodes.

11. The system of claim 10, wherein the structural representation of discourse is determined based on a theory of discourse analysis.

12. The system of claim 11, wherein the theory of discourse analysis is at least one of the Linguistic Discourse Model, the Unified Linguistic Discourse Model, Rhetorical Structure Theory, Discourse Structure Theory and Structured Discourse Representation Theory.

13. The system of claim 10, wherein non-structural measures of relevance are determined based on at least one of: statistics, keywords, knowledge bases.

14. The system of claim 10, wherein the processor determines every leaf discourse constituent containing an anaphor;
for each anaphor, the processor determines any unique preceding referents for the anaphor;
the processor substitutes the unique antecedent referent into the
preceding discourse constituent for the anaphor referent; and
the processor removes the preceding discourse containing the unique referent from the discourse constituents with relevance scores exceeding the threshold relevance score.

15. The system of claim 10, the percolation circuit determines every leaf discourse constituent containing an anaphor;
for each anaphor, the percolation circuit determines any unique preceding referents for the anaphor;
the percolation circuit substitutes the unique antecedent referent into the leaf discourse constituent for the anaphor;
the percolation circuit removes the discourse constituent containing the unique antecedent referent from the set of the discourse constituents with more relevant relevance scores.

16. The system of claim 10, wherein the processor determines important discourse constituent nodes based on a non-structural measure of relevance;
determines unresolved referents in the important discourse constituents;
determines potential resolving discourse constituents with potential to resolve referents;
percolates relevance score of important discourse constituents through a reduced span of potential resolving discourse constituents; and
determines a reduced span of discourse constituents based on relevance score.

17. A system for determining hybrid text summaries comprising:
an input/output circuit for retrieving a text;
a processor for determining discourse constituents for the text and attaching the discourse constituents into a structural representation of discourse;
a relevance score determination circuit for determining relevance scores for the discourse constituents based on at least one non-structural measure of relevance; and
a percolation circuit for percolating discourse constituent relevance scores based on the structural representation of discourse and where the processor determines a hybrid text summary based on the discourse constituents with relevance scores exceeding a threshold relevance score,
wherein for each child discourse constituent node in the structural representation, the percolation circuit assigns the relevance score of the child discourse constituent node to the parent discourse constituent node if the child discourse constituent node is more relevant than its parent;
for each coordinated discourse constituent node, the percolation circuit assigns the relevance score of the coordinated discourse constituent node to each preceding less relevant sibling node;
for each child discourse constituent node that is not a coordinated discourse constituent node and is not a subordinated discourse constituent node, the percolation circuit assigns the relevance score of the parent discourse constituent node to the child discourse constituent node if the parent discourse constituent is more relevant than the child;
for each coordinated discourse constituent node, the percolation circuit assigns the relevance score of the parent discourse constituent node to the coordinated discourse constituent node, if the coordinated discourse node and all its siblings are less relevant than the parent node;
for each subordinated discourse constituent node, the percolation circuit assigns the relevance score of the subordinated discourse constituent node to the subordinating discourse constituent if the subordinated discourse constituent is more relevant than the subordinating node; and
for each node, repeating these steps, until the percolation circuit can find no node whose relevance score is changed to the relevance score of another node.

18. The system of claim 17, wherein the percolation is applied to progressively larger sets of linked nodes.

19. A system for determining hybrid text summaries comprising:
an input/output circuit for retrieving a text;
a processor for determining discourse constituents for the text and attaching the discourse constituents into a structural representation of discourse;
a relevance score determination circuit for determining relevance scores for the discourse constituents based on at least one non-structural measure of relevance;
a percolation circuit for percolating discourse constituent relevance scores based on the structural representation of discourse; wherein for each discourse constituent leaf node, the percolation circuit determines the number of subordinated edges plus one and a score based on the inverse of the number of subordinated edges +1;
for each discourse constituent node, the percolation circuit assigns the score of a child discourse constituent node to the parent discourse constituent, if the score is less relevant;
for any subordination discourse constituent node, the percolation circuit assigns the score of the subordinated discourse constituent node to the subordinating discourse constituent node if the subordinated discourse constituent score is lower;
the percolation circuit assigns the scores of any coordination discourse constituent node to each child discourse constituent of the coordination if it is lower; and
the processor determines an adjusted relevance score based on the score and the subordination level; and
a hybrid text summary based on the discourse constituents with relevance scores exceeding a threshold relevance score.

20. The system of claim 19, the relevance circuit determines combined relevance score based on the relevance scores and non-structural relevance scores and percolating the combined relevance score.

21. A hybrid text summarization system comprising:
means for determining discourse constituents for a text;
means for determining a structural representation of discourse for the text;

means for determining relevance scores for discourse constituents;

means for percolating relevance scores based on the structural representation of discourse comprising the steps of:

means for each discourse constituent leaf node, determining the number of subordinated edges plus one;

means for determining a score based on the inverse of the number of subordinated edges +1;

means for each discourse constituent node, assigning the score of a child discourse constituent node to the parent discourse constituent node, if the score is less relevant;

means for any subordination discourse constituent node, assigning the score of the subordinated discourse constituent node to the subordinating discourse constituent node if the subordinated discourse constituent score is lower;

means for assigning the relevance scores of any coordination discourse constituent node to each child discourse constituent of the coordination if it is lower;

means for determining an adjusted relevance score based on the score and the subordination level; and means for determining a hybrid text summary based on discourse constituents with relevance scores compared to a threshold relevance score.

* * * * *